United States Patent
Shibata et al.

(10) Patent No.: US 9,875,532 B2
(45) Date of Patent: Jan. 23, 2018

(54) INFORMATION PROCESSING DEVICE THAT IMPLEMENTS IMAGE PROCESSING, AND IMAGE PROCESSING METHOD

(71) Applicant: NEC Corporation, Tokyo (JP)

(72) Inventors: Takashi Shibata, Tokyo (JP); Akihiko Iketani, Tokyo (JP); Shuji Senda, Tokyo (JP)

(73) Assignee: NEC Corporation, Tokyo (JP)

( * ) Notice: Subject to any disclaimer, the term of this patent is extended or adjusted under 35 U.S.C. 154(b) by 47 days.

(21) Appl. No.: 14/911,556

(22) PCT Filed: Jul. 18, 2014

(86) PCT No.: PCT/JP2014/003824
§ 371 (c)(1),
(2) Date: Feb. 11, 2016

(87) PCT Pub. No.: WO2015/022771
PCT Pub. Date: Feb. 19, 2015

(65) Prior Publication Data
US 2016/0189357 A1    Jun. 30, 2016

(30) Foreign Application Priority Data

Aug. 15, 2013 (JP) .................. 2013-168793

(51) Int. Cl.
*G06K 9/48* (2006.01)
*G06T 7/00* (2017.01)
(Continued)

(52) U.S. Cl.
CPC .............. *G06T 7/0002* (2013.01); *G06K 9/40* (2013.01); *G06K 9/481* (2013.01); *G06K 9/6215* (2013.01);
(Continued)

(58) Field of Classification Search
CPC . G06T 2207/20081; G06T 2207/20221; G06T 3/4053; G06T 5/001; G06T 5/003;
(Continued)

(56) References Cited

U.S. PATENT DOCUMENTS 4,503,557 A * 3/1985 Maeda ...................... G06K 9/62
382/218
9,436,981 B2 * 9/2016 Shibata ................ G06N 99/005
(Continued)

FOREIGN PATENT DOCUMENTS

JP    2005-149395    6/2005
JP    2010-273764    12/2010
(Continued)

OTHER PUBLICATIONS

International Search Report and Written Opinion dated Oct. 7, 2014 in corresponding PCT International Application.

*Primary Examiner* — Ali Bayat
(74) *Attorney, Agent, or Firm* — Finnegan, Henderson, Farabow, Garrett & Dunner, L.L.P.

(57) ABSTRACT

The present invention provides an information processing device in which a degradation process of an input image is accurately estimated and a dictionary necessary for generating a desired restored image from the input image can be obtained. The information processing device is provided with: an image acquisition means that acquires a plurality of study images and an input image; and an estimation means that, on the basis of similarity between an arbitrary region of the input image and each of a plurality of degradation images in a case where regions of the study images corresponding to the arbitrary region are degraded on the basis of each of the plurality of degradation processes, outputs an estimated degradation process corresponding to the degradation process corresponding to the region of the input image.

14 Claims, 23 Drawing Sheets

(51) Int. Cl.
  *G06K 9/68* (2006.01)
  *G06K 9/62* (2006.01)
  *G06T 3/40* (2006.01)
  *G06T 5/00* (2006.01)
  *G06K 9/40* (2006.01)

(52) U.S. Cl.
  CPC ......... *G06K 9/6255* (2013.01); *G06K 9/6857* (2013.01); *G06T 3/4053* (2013.01); *G06T 5/001* (2013.01); *G06T 2207/20081* (2013.01)

(58) Field of Classification Search
  CPC .... G06T 7/0002; G06K 9/481; G06K 9/6215; G06K 9/40; G06K 2209/01; H04N 19/107; H04N 19/124
  See application file for complete search history.

(56) References Cited

U.S. PATENT DOCUMENTS

| | | | |
|---|---|---|---|
| 9,443,287 B2 * | 9/2016 | Kimura | ............ G06K 9/00 |
| 2009/0245658 A1 * | 10/2009 | Fujimoto | ............ G06K 9/6814 |
| | | | 382/218 |
| 2012/0294512 A1 * | 11/2012 | Matsuda | ............ G06T 3/4053 |
| | | | 382/155 |

FOREIGN PATENT DOCUMENTS

| | | |
|---|---|---|
| JP | 2012-113513 | 6/2012 |
| JP | 2012-244395 | 12/2012 |
| JP | 2013-26659 | 2/2013 |
| WO | WO 2013/089265 A1 | 6/2013 |

* cited by examiner

Fig.3

860 CORRESPONDENCE INFORMATION

| DEGRADATION PROCESS | FEATURE VECTOR |
|---|---|
| ⋮ | ⋮ |
| B1、C2、L3、F1 | [00、01、11、12、22、23、33、33、⋯⋯] |
| B2、C2、L3、F1 | [01、05、13、18、24、26、32、33、⋯⋯] |
| B3、C2、L3、F1 | [04、10、16、20、25、28、31、32、⋯⋯] |
| B0、C3、L3、F1 | [01、01、12、12、23、23、33、33、⋯⋯] |
| ⋮ | ⋮ |

861 / 862

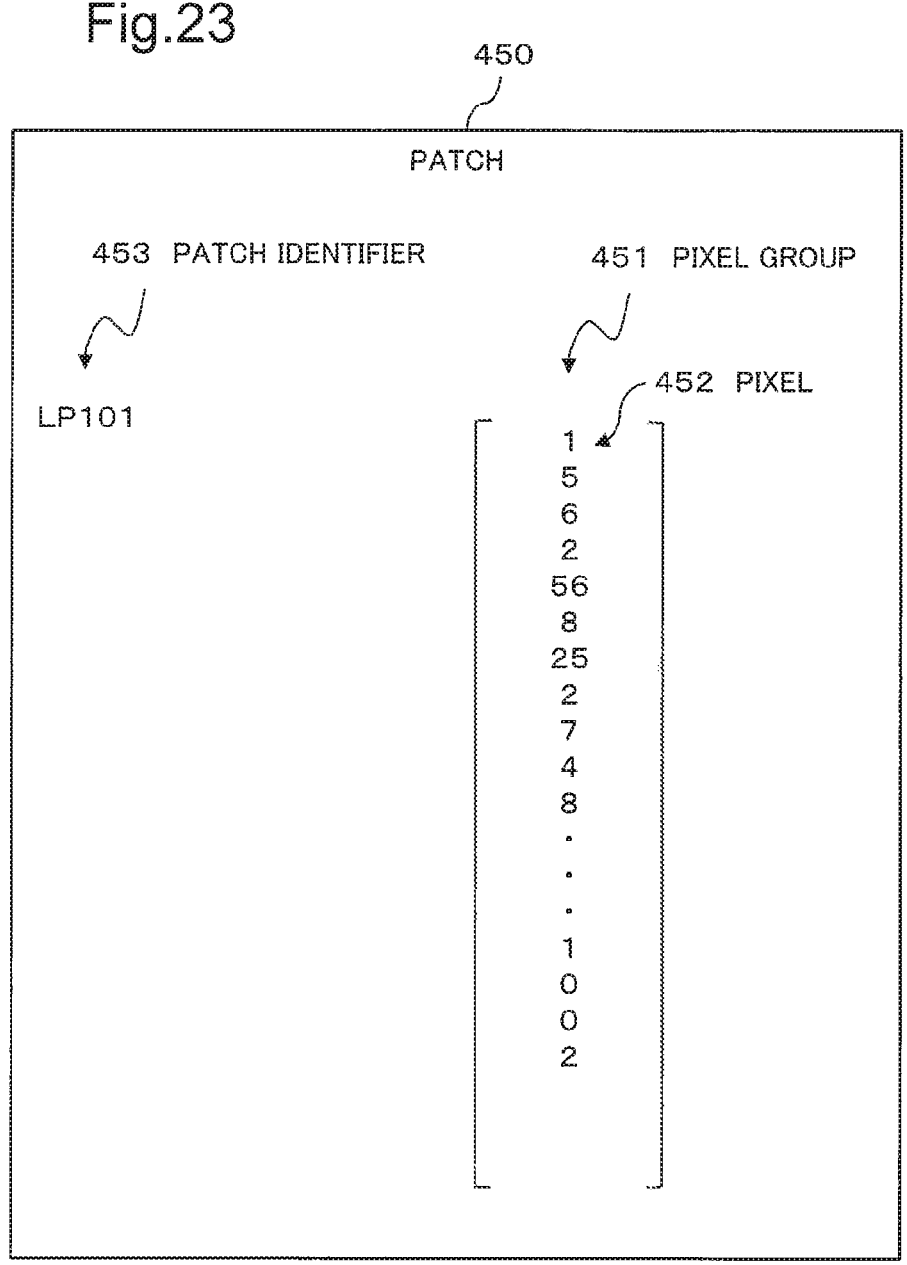

INFORMATION PROCESSING DEVICE THAT IMPLEMENTS IMAGE PROCESSING, AND IMAGE PROCESSING METHOD

CROSS-REFERENCE TO RELATED PATENT APPLICATIONS

This application is a National Stage Entry of International Application No. PCT/JP2014/003824, filed Jul. 18, 2014, which claims priority from Japanese Patent Application No. 2013-168793, filed Aug. 15, 2013. The entire contents of the above-referenced applications are expressly incorporated herein by reference.

TECHNICAL FIELD

The present invention relates to an image processing technology, and in particular to a technology to generate a dictionary that is used in study based super-resolution processing.

BACKGROUND ART

In relation to image processing, various related technologies have been known.

For example, as an example of a technology to generate a restored image (for example, a high-resolution image) from an input image (for example, a low-resolution image), super-resolution technology is known. Among the super-resolution technologies, a technology to generate a high-resolution image using a dictionary is, in particular, referred to as a study based super-resolution technology. The dictionary mentioned above is a dictionary that are created through studying cases each of which includes a study image (in general, a high-quality image) and a degraded image corresponding to the study image (for example, an image created by reducing the resolution of the study image). The restored image generated by the super-resolution technology is also referred to as a super-resolution image.

PTL 1 discloses an example of a character recognition device. The character recognition device disclosed in PTL 1 performs super-resolution processing to recognize characters on a license plate or the like, which are included in an object image taken with a camera.

The character recognition device performs the super-resolution processing by using a database (dictionary) in which low-resolution dictionary images, feature values of the low-resolution dictionary images, and high-resolution dictionary images are associated with one another. The low-resolution dictionary images mentioned above are images of characters that have been taken with the camera with which the object image is taken. The feature values are feature values that are calculated on the basis of respective ones of the low-resolution dictionary images. The high-resolution dictionary images are images of characters that have been taken with a camera that has a higher resolution compared with the camera with which the object image is taken.

PTL 2 discloses an example of a super-resolution image processing device. The super-resolution image processing device disclosed in PTL 2 outputs a high-resolution image from a low-resolution original image (input image data).

The super-resolution image processing device uses a dictionary table and others, which have been generated by a dictionary creation device, to infer lost high frequency components in generating output image data through applying super-resolution image processing to the input image data. The dictionary table and others mentioned above are a dictionary table, a first principal component basis vector, and a second principal component basis vector. The dictionary creation device generates the dictionary table and others that are optimized for a specific scene by the following procedure.

First, the dictionary creation device acquires a sectioned bitmap, which is a processing object, from a sample image file, breaks down the acquired bitmap into a plurality of broken bitmaps, and stores the broken bitmaps in records in a temporary table.

Next, the dictionary creation device applies MP (Max-Plus) wavelet transformation processing, permutation processing, principal component analysis processing, inner product operation processing, and frequency partition processing to the broken bitmaps in order, and stores results of the processing in respective fields in the temporary table. In the principal component analysis processing, the dictionary creation device calculates the first principal component basis vector and the second principal component basis vector.

Last, the dictionary creation device creates the dictionary table, which has a smaller number of records compared with the temporary table, using a mean value operation unit. The dictionary table differs from the dictionary of the above-described study based super-resolution technology. That is, the dictionary table is not a dictionary that is created through studying cases in which study images are associated with degraded images.

PTL 3 discloses an example of an image super-resolution device. The image super-resolution device disclosed in PTL 3 generates a super-resolution image that is enlarged with a preset enlargement ratio from an input image degraded due to encoding and decoding. The encoding and decoding mentioned above are encoding and decoding by a preset encoding method. Specifically, the image super-resolution device generates a super-resolution image through the following processing.

First, the image super-resolution device partitions an input image into blocks of a prefixed size, and cuts out respective ones of the blocks as processing blocks. Next, the image super-resolution device generates enlarged processing blocks by enlarging the processing blocks with a prefixed enlargement ratio. The prefixed enlargement ratio is an enlargement ratio with which the image super-resolution device enlarges the input image when the image super-resolution device generates the super-resolution image.

Second, the image super-resolution device writes reference blocks and degraded reference blocks in association with each other in a block storage means. The reference blocks mentioned above are blocks that are cut out from the input image and have the same size as that of the processing blocks. The degraded reference blocks mentioned above are blocks into which the reference blocks are degraded by a specific degradation process. The specific degradation process is a degradation process when it is assumed that the input image is an image into which the to-be-generated super-resolution image has been degraded through the degradation process. Specifically, the image super-resolution device degrades the reference blocks using a degradation model based on an encoding method by which the input image has been degraded (a model that simulates predefined orthogonal transformation, quantization, and so on) to generate the degraded reference blocks.

Third, the image super-resolution device calculates similarities between the degraded reference blocks and the processing blocks.

Fourth, the image super-resolution device enlarges the degraded reference blocks with the prefixed enlargement ratio to generate restored reference blocks. Further, the image super-resolution device calculates differences between the restored reference blocks and the reference blocks as loss components.

Fifth, the image super-resolution device combines the enlarged processing blocks with the loss components on the basis of the similarities to generate super-resolution blocks. The image super-resolution device constructs the super-resolution blocks into an image to generate the super-resolution image into which the input image is enlarged.

CITATION LIST

Patent Literature

[PTL 1] Japanese Unexamined Patent Application Publication No. 2005-149395
[PTL 2] Japanese Unexamined Patent Application Publication No. 2013-026659
[PTL 3] Japanese Unexamined Patent Application Publication No. 2012-113513

SUMMARY OF INVENTION

Technical Problem

However, the above-described technologies disclosed in the documents cited in the citation list have a problem in that there is a case in which it is impossible to obtain a dictionary that is required to generate a desired restored image (super-resolution image) from an input image and used in study based super-resolution processing.

That is because accurate estimation of a degradation process applied to an input image is difficult and complicated.

Specifically, the character recognition device disclosed in PTL 1 does not estimate a degradation process of the object image. In the character recognition device, the low-resolution dictionary images (equivalent to degraded images in the dictionary used in the study based super-resolution processing) are images of characters that have been taken with a camera with which the object image is taken. That is, the low-resolution dictionary images included in the database (dictionary) are not images that are obtained by estimating a degradation process of the object image.

The super-resolution image processing device in PTL 2 generates the dictionary table and others by operations using functions or the like on the basis of a sample image file (equivalent to study images in the dictionary used in the study based super-resolution processing). The dictionary table and others are a dictionary optimized for a specific scene but not a dictionary obtained by performing estimation of a degradation process.

The super-resolution processing performed by the image super-resolution device in PTL 3 is super-resolution processing when a degradation process is apparent beforehand. Thus, the image super-resolution device is incapable of processing an input image the degradation process of which is unclear.

Further, it is difficult to estimate an accurate degradation process by a technology like blind de-convolution or the like. The blind de-convolution mentioned above is a method, targeting natural images, to restore an original signal from a measured signal. Further, it is difficult and substantially complicated for a user (operator) to estimate an accurate degradation process on the basis of experience or the like.

An object of the present invention is to provide an information processing device, an image processing method, and a program or a non-transitory computer-readable recording medium recording a program that are capable of solving the above-described problem.

Solution to Problem

An information processing device according to an exemplary aspect of the present invention includes: image acquisition means for acquiring a plurality of first study images and an input image; and estimation means for outputting an estimated degradation process on a basis of first similarities between an arbitrary region in the input image and respective ones of a plurality of first degraded images when regions, in the first study images, corresponding to the region are degraded on a basis of respective ones of a plurality of degradation processes, wherein the estimated degradation process corresponds to a degradation process in the degradation processes, the degradation process being related to the region in the input image.

An image processing method according to an exemplary aspect of the present invention, using a computer implementing the image processing method, includes: acquiring a plurality of first study images and an input image; and outputting an estimated degradation process on a basis of first similarities between an arbitrary region in the input image and respective ones of a plurality of first degraded images when regions, in the first study images, corresponding to the region are degraded on a basis of respective ones of a plurality of degradation processes.

A non-transitory computer-readable recording medium according to an exemplary aspect of the present invention, recording a program that makes a computer execute processing of: acquiring a plurality of first study image and an input image; and outputting an estimated degradation process on a basis of first similarities between an arbitrary region in the input image and respective ones of a plurality of first degraded images when regions, in the first study images, corresponding to the region are degraded on a basis of respective ones of a plurality of degradation processes.

Advantageous Effects of Invention

The present invention has an advantageous effect in that it becomes possible to estimate a degradation process applied to an input image accurately and obtain a dictionary required to generate a desired restored image from the input image.

BRIEF DESCRIPTION OF DRAWINGS

FIG. 3 is a diagram illustrating an example of correspondence information in the first exemplary embodiment.

FIG. 23 is a diagram illustrating an example of a patch in the third exemplary embodiment.

DESCRIPTION OF EMBODIMENTS

Exemplary embodiments to achieve the present invention will be described in detail with reference to the accompanying drawings. In the respective drawings and the exemplary embodiments described in the description, the same signs are assigned to the same components and descriptions thereof will be omitted appropriately.

First Exemplary Embodiment

Figure 1:
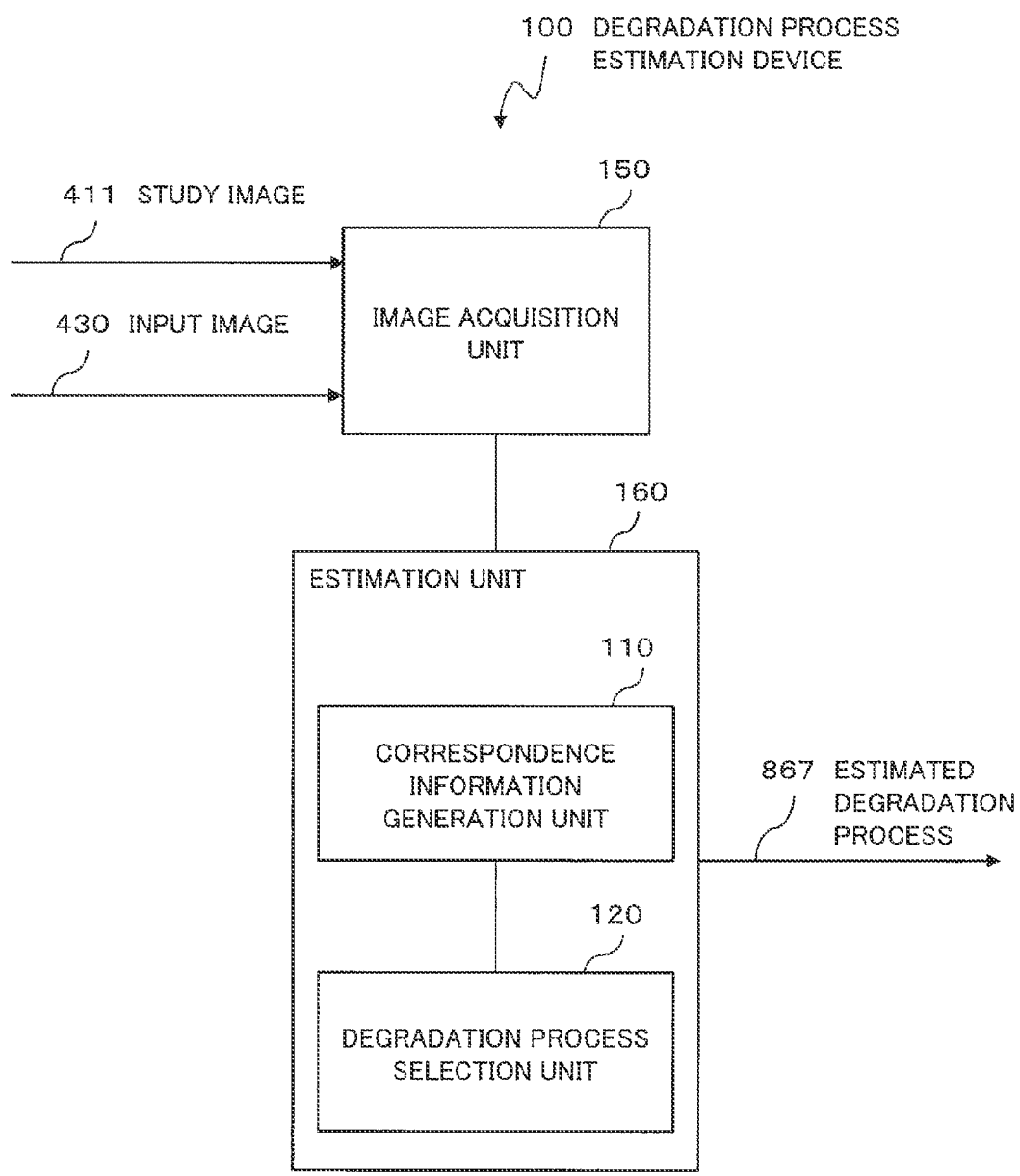
FIG. 1 is a block diagram illustrating a configuration of a degradation process estimation device according to a first exemplary embodiment of the present invention.

FIG. 1 is a block diagram illustrating a configuration of a degradation process estimation device (also referred to as an information processing device) 100 according to a first exemplary embodiment of the present invention.

As illustrated in FIG. 1, the degradation process estimation device 100 according to the present exemplary embodiment includes an image acquisition unit 150 and an estimation unit 160.

Figure 2:
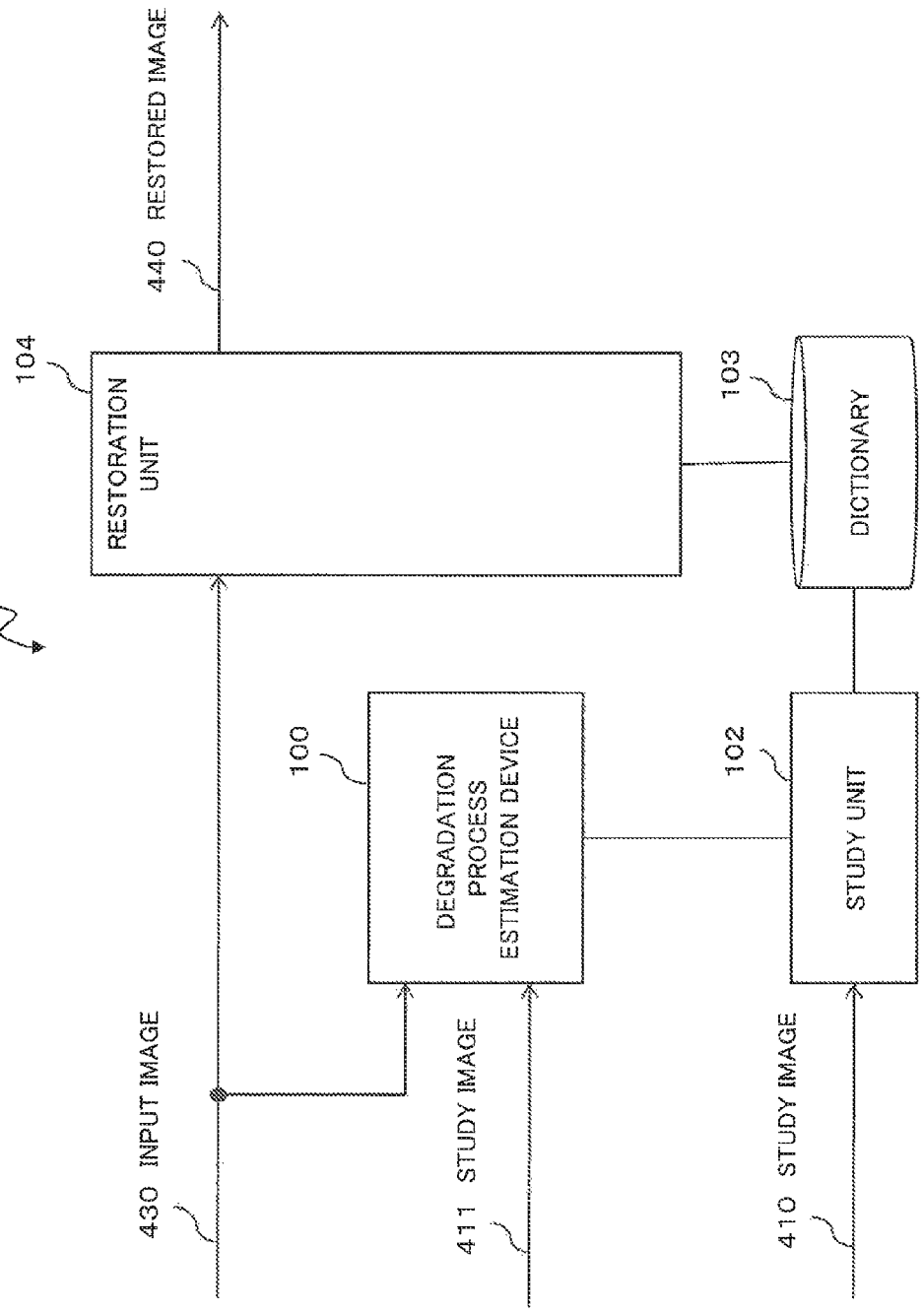
FIG. 2 is a block diagram illustrating a configuration of an image processing system that includes the degradation process estimation device according to the first exemplary embodiment.

FIG. 2 is a block diagram illustrating a configuration of an image processing system 101 that includes the degradation process estimation device 100 according to the present exemplary embodiment.

As illustrated in FIG. 2, the image processing system 101 according to the present exemplary embodiment includes the degradation process estimation device 100, a study unit 102, a dictionary 103, and a restoration unit 104. The image processing system 101 is also referred to as an information processing device.

First, an overall operation of the image processing system 101, which includes the degradation process estimation device 100 according to the present exemplary embodiment, will be described.

The degradation process estimation device 100 acquires study images 411 (first study images) and an input image 430, which are, for example, input from the outside. The study images 411 are high-resolution images (high-quality images) that may correspond to the input image 430 and have been prepared in advance. The input image 430 is an image that is an object of restoration. In general, the input image 430 is a low-quality image, such as a low-resolution image.

The degradation process estimation device 100 outputs an estimated degradation process 867 to the study unit 102 on the basis of the study images 411 and the input image 430. The estimated degradation process 867 is information of a degradation process of an image (information indicating degradation details of an image), which the study unit 102 uses to generate the dictionary 103. The dictionary 103 is the dictionary 103 required for the restoration unit 104 to generate a desired restored image 440 from the input image 430.

The study unit 102 acquires study images 410 (second study images), which are, for example, input from the outside, and the estimated degradation process 867, which is input from the degradation process estimation device 100. The study unit 102 generates the dictionary 103 on the basis of the study images 410 and the estimated degradation process 867. The study images 410 are high-resolution images (high-quality images) that may correspond to the input image 430 and have been prepared in advance. A set of study images 410 and a set of study images 411 may overlap completely, overlap partially, or not overlap at all.

Figure 20:
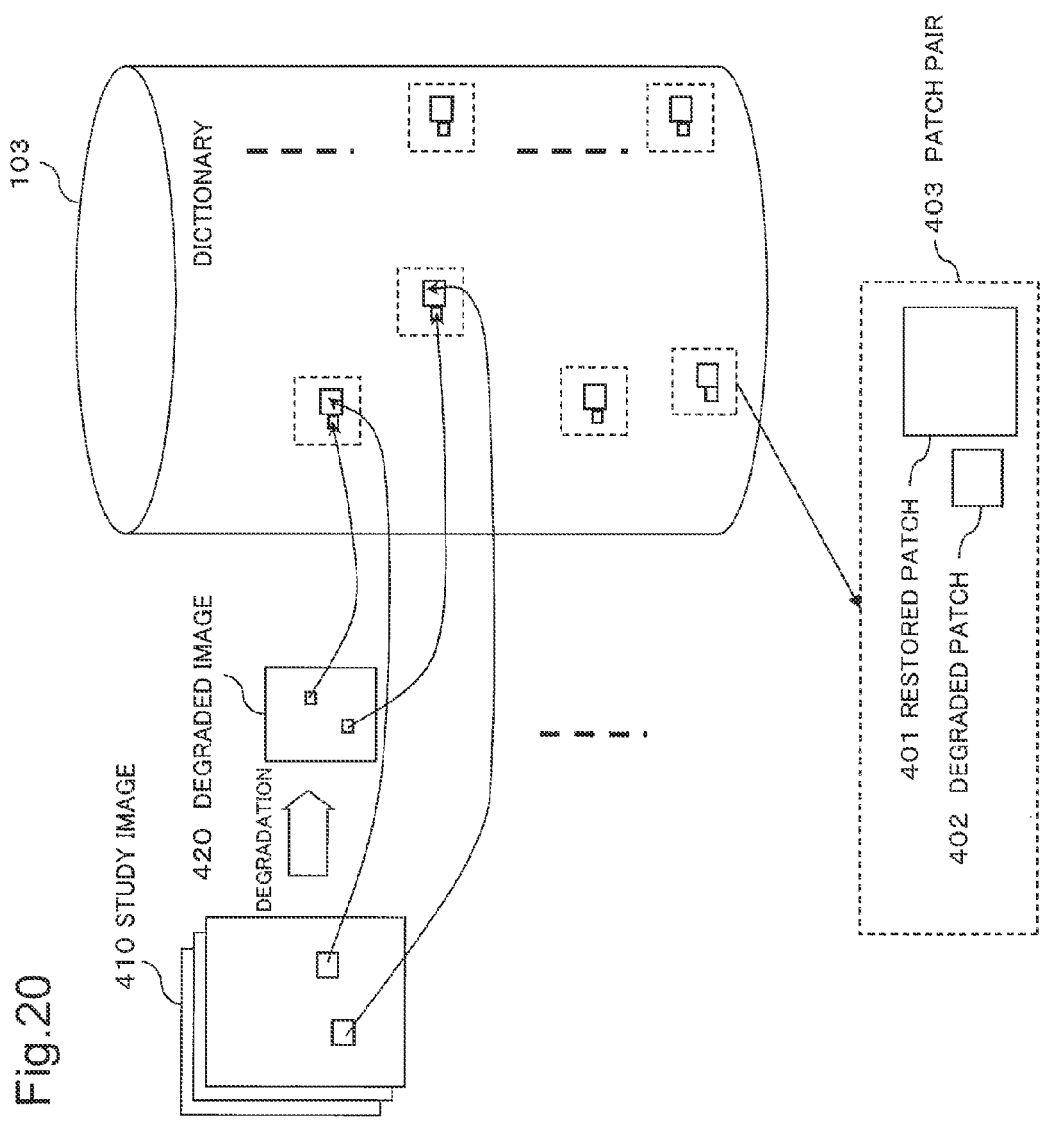
FIG. 20 is a diagram for explaining generation of a dictionary in the third exemplary embodiment.

Specifically, first, on the basis of the estimated degradation process 867, the study unit 102 generates degraded images 420 (second degraded images, which will be described later and are illustrated in FIG. 20) each of which corresponds to one of the study images 410. Second, the study unit 102 generates the dictionary 103 that includes a patch in the study images 410 and a patch in the corresponding degraded images 420 in pairs. The patch mentioned above is one of small regions into which an image (a study image 410, a degraded image 420, or the like) is partitioned.

The restoration unit 104 acquires the input image 430, which is input from the outside, and outputs a restored image 440 to the outside. The restoration unit 104 generates the restored image 440 corresponding to the input image 430 on the basis of entries in the dictionary 103.

Next, the respective components (the image acquisition unit 150 and the estimation unit 160) that the degradation process estimation device 100 in the first exemplary embodiment includes will be described. The components illustrated in FIG. 1 may be either components corresponding to hardware units or components the division of which is done in accordance with functional units of a computer device. The components illustrated in FIG. 1 will be described herein as components the division of which is done in accordance with functional units of a computer device.

===Correspondence Information 860===

Figure 4:
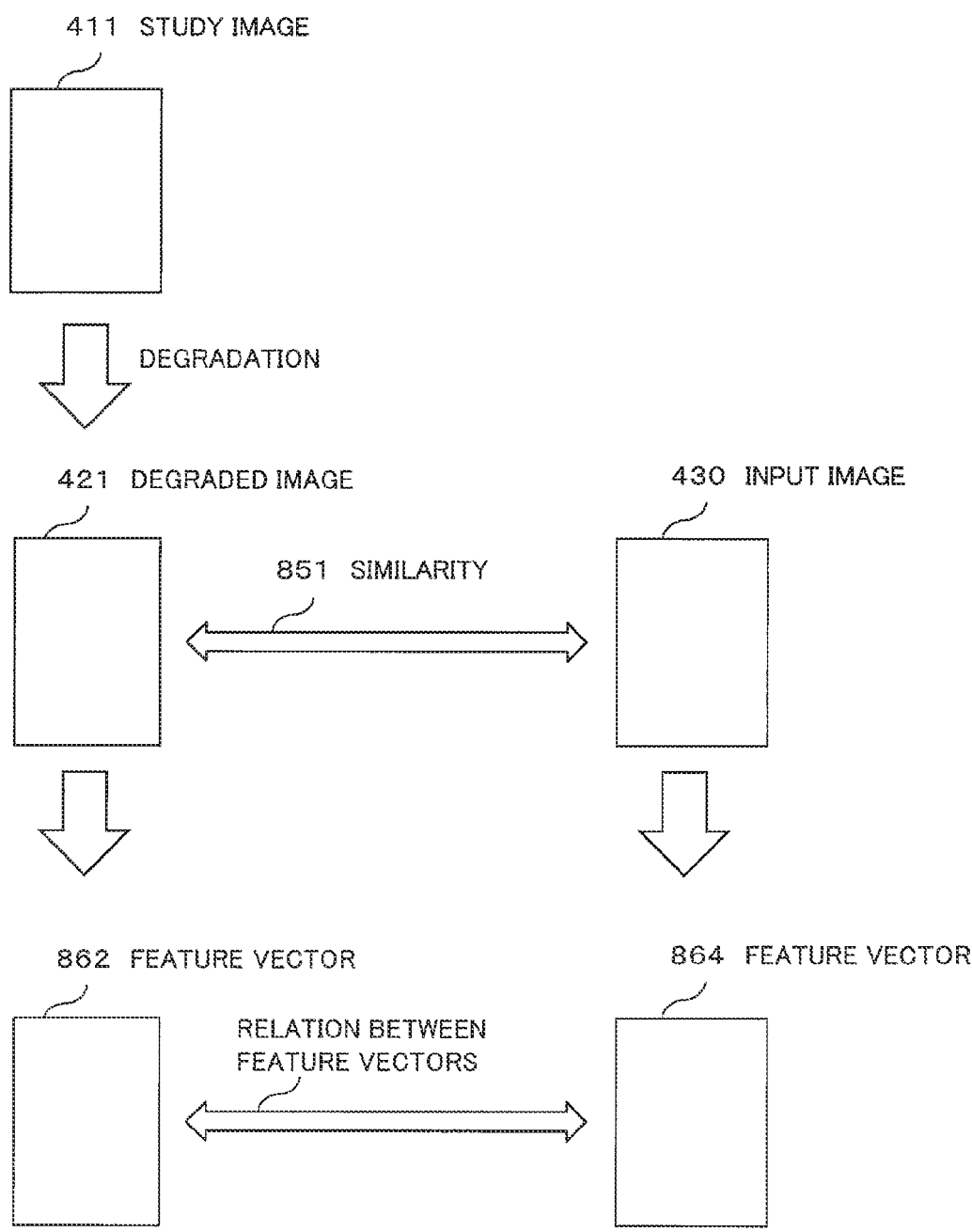
FIG. 4 is a diagram illustrating relations among a study image, a degraded image, an input image, feature vectors, and a similarity in the first exemplary embodiment.

FIG. 3 is a diagram illustrating an example of correspondence information 860, which is stored in a not-illustrated storage means in the degradation process estimation device 100. As illustrated in FIG. 3, each record in the correspondence information 860 includes a degradation process 861 and a feature vector 862 (a first feature vector, which will be described late and is illustrated in FIG. 4). The correspondence information 860 illustrated in FIG. 3 is used in after-mentioned processing that is performed by the estimation unit 160 in the degradation process estimation device 100.

Each of the degradation processes 861 illustrated in FIG. 3 is information that discriminates a degradation process (degradation details) of an image. Each of the degradation processes of an image is an arbitrary combination of, for example, intensity of blur, a compression ratio, luminance, a field in interlacing, and the like. For example, a degradation process 861 expresses degradation details in respective ones of intensity of blur, a compression ratio, luminance, and a field in interlacing as "B3", "C2", "L3", and "F1", respectively. In addition, posture, noise, or the like may be added to the degradation process.

Each feature vector 862 is, for example, a vector that has the absolute values of Fourier transformed quantities of a degraded image 421 (a first degraded image, which will be described later and is illustrated FIG. 4) or the logarithmic values of the absolute values as elements, which are arranged in raster scan order. Each feature vector 862 may have the absolute values of transformed quantities of a degraded image 421 by, without being limited to a Fourier transformation, an integral transform, such as a Laplace transform, that focuses on the frequency part, or the logarithmic values of the absolute values as elements. Each feature vector 862 may also be a vector that has respective pixel values of a degraded image 421, which are normalized with respect to luminance, as elements, which are arranged in raster scan order.

===Image Acquisition Unit 150===

The image acquisition unit 150 acquires a plurality of study images 411 and an input image 430.

===Estimation Unit 160===

The estimation unit 160 outputs an estimated degradation process 867 on the basis of similarities 851 (first similarities, which will be described later and are illustrated in FIG. 4) between an arbitrary region in the input image 430 and respective ones of a plurality of degraded images 421. The estimated degradation process 867 mentioned above corresponds to a degradation process 861 that corresponds to the region in the input image 430.

The arbitrary region mentioned above is either an arbitrary local region in the image or the whole region of the image. That is, the arbitrary region in the input image 430 is an arbitrary partial image of the input image 430 or the whole of the input image 430. The present exemplary embodiment is an exemplary embodiment when the arbitrary region is the whole of an image. The case in which an arbitrary region is a local region will be described in a second exemplary embodiment. Thus, since, in the present exemplary embodiment, "an arbitrary region in the input image 430" is the whole of the input image 430, that is, the input image 430 itself, hereinafter, "the whole of the input image 430 as an arbitrary region in the input image 430" will be simply referred to as "input image 430".

The degraded images 421 are images when the study images 411 are degraded on the basis of respective ones of the plurality of degradation processes 861.

The similarities 851 correspond to, for example, relations between the feature vectors 862 corresponding to the degraded images 421 and a feature vector 864 (a second feature vector, which will be described later and is illustrated in FIG. 4) corresponding to the input image 430.

Each relation is, for example, a value based on a distance between two vectors (in the present exemplary embodiment, a feature vector 862 and the feature vector 864). The relation may also be a value based on an angle between two feature vectors. Further, the relation may also be a value calculated by a normalized cross-correlation function, and is not limited to these values. The feature vector 864 is a vector that has the same structure as the feature vectors 862.

FIG. 4 is a diagram illustrating relations among the above-described study image 411, degraded image 421, input image 430, feature vector 862, feature vector 864, and similarity 851.

The estimated degradation process 867 is, for example, a degradation process 861 corresponding to the input image 430. That is, the estimation unit 160 outputs a degradation process 861 corresponding to the input image 430 as the estimated degradation process 867 on the basis of the similarities 851 and the correspondence information 860.

In this case, the correspondence information 860 indicates correspondence relations between the respective feature vectors 862 of the degraded images 421 and degradation details from the study images 411 (first study images) to respective ones of the degraded images 421. In other words, the correspondence information 860 indicates relations between the degraded images 421 and the degradation processes 861.

As described above, a degradation process 861 is discrimination information that specifies a degradation process from a study image 411 to a degraded image 421. The degradation process 861 related to the input image 430, that is, the estimated degradation process 867, is a degradation process 861 that indicates degradation details in degradation processing when it is assumed that the input image 430 is an image created by applying the degradation processing to a specific image. The specific image is a restored image (also referred to as a super-resolution image) 440 that the restoration unit 104 generates.

In other words, the estimated degradation process 867 indicates degradation details in a degraded image 421 with respect to a study image 411. At the same time, the estimated degradation process 867 indicates degradation details in a degraded image 420 with respect to a study image 410. That is because both the study images 410 and the study images 411 are high-resolution images (high-quality images) that may correspond to the input image 430.

The estimated degradation process 867 may be information from which the degradation process estimation device 100 and the study unit 102 are able to discriminate degradation details therein in synchronization with each other. For example, the estimated degradation process 867 may be information that specifically indicates degradation details therein as the degradation processes 861, or may be a serial number.

As illustrated in FIG. 2, the estimation unit 160 includes, for example, a correspondence information generation unit 110 and a degradation process selection unit 120.

===Correspondence Information Generation Unit 110===

The correspondence information generation unit 110 generates the correspondence information 860.

For example, the correspondence information generation unit 110 generates the degraded images 421 from the study images 411 on the basis of the degradation processes 861. For example, each of the degradation processes 861 indicates typical degradation details selected on the basis of, for example, empirical knowledge from among all degradation details that may correspond to the study images 410. Next, the correspondence information generation unit 110 generates the feature vectors 862 of the generated degraded images 421.

The number of study images 411 and the number of degradation processes 861 are arbitrary. The number of degraded images 421 is the number of study images 411 multiplied by the number of degradation processes 861. For example, when the number of study images 411 is 10000 and the number of types of degradation processes 861 is 100, the number of degraded images 421 is 1000000.

In this case, the number of feature vectors 862 is 1000000, which is the same as the number of degraded images 421. In other words, the correspondence information 860 includes 1000000 records, each of which includes a pair of a feature vector 862 and a degradation process 861.

===Degradation Process Selection Unit 120===

The degradation process selection unit 120 selects a degradation process 861 from the correspondence information 860 on the basis of the similarities 851 between the input image 430 and the degraded images 421, and outputs the selected degradation process 861 as the estimated degradation process 867.

Specifically, the degradation process selection unit 120 selects a degradation process 861 from the correspondence information 860 on the basis of relations between the feature vector 864 related to the input image 430 and the feature vectors 862 included in the correspondence information 860. Next, the degradation process selection unit 120 outputs the selected degradation process 861 to the outside (for example, the study unit 102) as the estimated degradation process 867.

Figure 5:
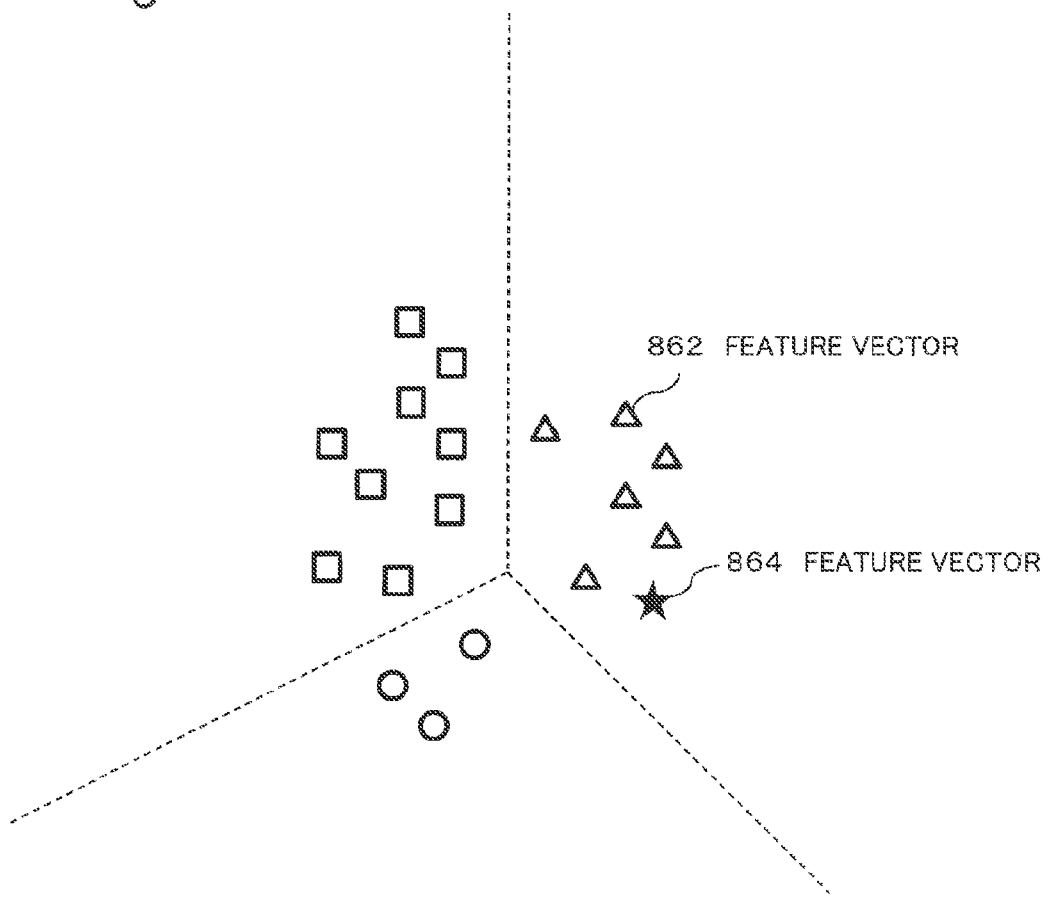
FIG. 5 is a diagram for explaining selection of an estimated degradation process in the first exemplary embodiment.

FIG. 5 is a diagram for explaining selection of a degradation process 861 by the degradation process selection unit 120.

It is assumed herein that feature vectors (feature vectors 862 and a feature vector 864) are three-dimensional vectors. In FIG. 5, respective ones of dotted lines indicate respective axes in a three-dimensional space where the feature vectors exist.

In FIG. 5, squares, triangles, and circles indicate feature vectors 862 belonging to a square class, a triangle class, and a circle class, respectively. The classes mentioned above are related to types of degradation processes 861. That is, the square class, the triangle class, and the circle class are related to respective ones of three types of degradation processes 861.

In FIG. 5, a star shape indicates the feature vector 864 (the feature vector related to the input image 430).

The degradation process selection unit 120 classifies the feature vector 864 (star shape) into any one of the square class, the triangle class, and the circle class. For example, the degradation process selection unit 120 classifies the feature vector 864 into any one of the classes on the basis of relations between the centroids of the feature vectors 862 in the respective classes and the feature vector 864. For example, the degradation process selection unit 120 may classify the feature vector 864 into the class to which a feature vector 862 having the shortest distance from the feature vector 864 belongs.

Next, the degradation process selection unit 120 selects a degradation process 861 corresponding to the class into which the feature vector 864 (star shape) has been classified. Subsequently, the degradation process selection unit 120 outputs the selected degradation process 861 to the outside (for example, the study unit 102) as the estimated degradation process 867.

In the above description, the degradation process selection unit 120 classifies the feature vector 864 into a nearest neighbor class, and selects only one degradation process 861 related to the nearest neighbor class. However, the degradation process selection unit 120 may classify the feature vector 864 into a plurality of classes. For example, the degradation process selection unit 120 may classify the feature vector 864 into k-nearest neighbor (k is an arbitrary natural number equal to or greater than 1) classes. In this case, the degradation process selection unit 120 may output the degradation processes 861 that is related to respective ones of the k classes as estimated degradation processes 867.

The above is a description of the respective components corresponding to functional units of the degradation process estimation device 100.

Next, components corresponding to hardware units of the degradation process estimation device 100 will be described.

Figure 6:
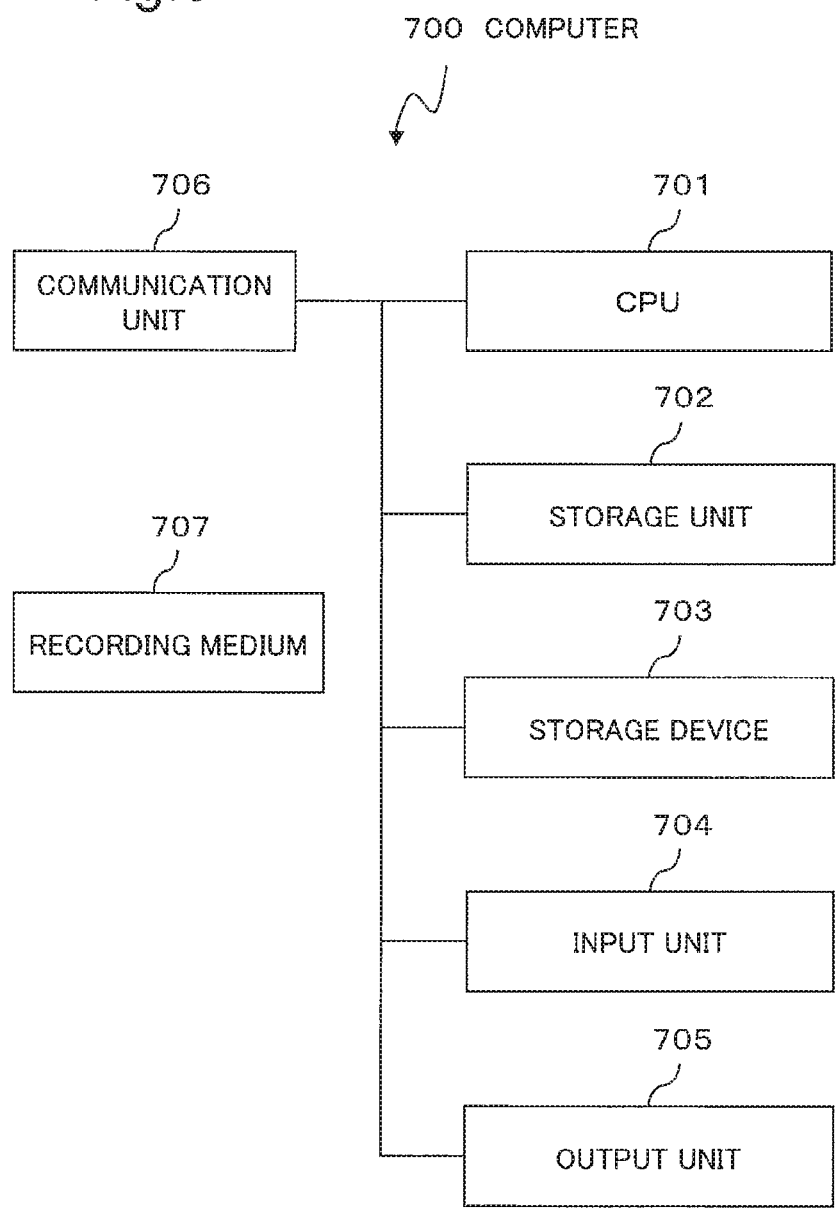
FIG. 6 is a block diagram illustrating a hardware configuration of a computer that achieves the degradation process estimation device according to the first exemplary embodiment.

FIG. 6 is a diagram illustrating a hardware configuration of a computer 700 that achieves the degradation process estimation device 100 in the present exemplary embodiment.

As illustrated in FIG. 6, the computer 700 includes a CPU (Central Processing Unit) 701, a storage unit 702, a storage device 703, an input unit 704, an output unit 705, and a communication unit 706. Further, the computer 700 includes a recording medium (or a storage medium) 707, which is supplied from the outside. The recording medium 707 may be a nonvolatile recording medium that stores information non-transitorily.

The CPU 701 operates an operating system (not illustrated) and controls the whole operation of the computer 700. The CPU 701 also reads a program and data from, for example, the recording medium 707, which is mounted on the storage device 703, and writes the read program and data in the storage unit 702. The program mentioned above is, for example, a program that makes the computer 700 carry out an operation of a flowchart illustrated in FIG. 7, which will be described later.

The CPU 701 carries out various processing as the image acquisition unit 150 and the estimation unit 160 illustrated in FIG. 1 in accordance with the read program and on the basis of the read data.

The CPU 701 may be configured to download the program and data from an external computer (not illustrated) connected to communication networks (not illustrated) into the storage unit 702.

The storage unit 702 stores the program and data. The storage unit 702 stores, for example, the study images 411, the degraded images 421, the input image 430, and the correspondence information 860.

The storage device 703 is, for example, an optical disk, a flexible disk, a magneto-optical disk, an external hard disk, or a semiconductor memory, and includes the recording medium 707. The storage device 703 (the recording medium 707) stores the program in a computer-readable manner. The storage device 703 may also store the data. The storage device 703 stores, for example, the study images 411, the degraded images 421, the input image 430, and the correspondence information 860.

The input unit 704 is achieved by, for example, a mouse, a keyboard, built-in key buttons, or the like, and is used in input operations. The input unit 704 is not limited to a mouse, a keyboard, and built-in key buttons, and may also be, for example, a touch panel.

The output unit 705 is achieved by, for example, a display, and is used to confirm an output.

The communication unit 706 achieves an interface to the outside. The communication unit 706 is included in the image acquisition unit 150 and the estimation unit 160 as portions thereof. The degradation process estimation device 100 may be connected to the study unit 102 via the communication unit 706.

As described above, the blocks corresponding to functional units of the degradation process estimation device 100, illustrated in FIG. 1, are achieved by the computer 700, which has the hardware configuration illustrated in FIG. 6. However, means for achieving the respective components included in the computer 700 are not limited to the above-described components. That is, the computer 700 may be achieved by a physically-connected single device or by a plurality of physically-separate devices that are interconnected by wires or radio waves.

The recording medium 707 recording codes of the above-described program may be supplied to the computer 700, and the CPU 701 may read and execute the codes of the program recorded in the recording medium 707. Alternatively, the CPU 701 may store the codes of the program recorded in the recording medium 707 in the storage unit 702 or the storage device 703 or both. That is, the present exemplary embodiment includes an exemplary embodiment of a recording medium 707 that stores, transitorily or non-transitorily, a program (software) that a computer 700 (a CPU 701) executes. A storage medium that stores information non-transitorily is also referred to as a nonvolatile storage medium.

The computer 700 may achieve the image processing system 101 illustrated in FIG. 2. In this case, the CPU 701 carries out various processing, in accordance with a read program and on the basis of read data, as the degradation process estimation device 100, the study unit 102, and the restoration unit 104, illustrated in FIG. 2. The storage unit 702 and the storage device 703 may include the dictionary 103. The storage unit 702 and the storage device 703 may further store the study images 410, the degraded images 420, and the restored image 440.

The above is a description of the respective components corresponding to hardware units of the computer 700 that achieves the degradation process estimation device 100 in the present exemplary embodiment.

Next, an operation of the present exemplary embodiment will be described in detail with reference to FIGS. 1 to 7.

Figure 7:
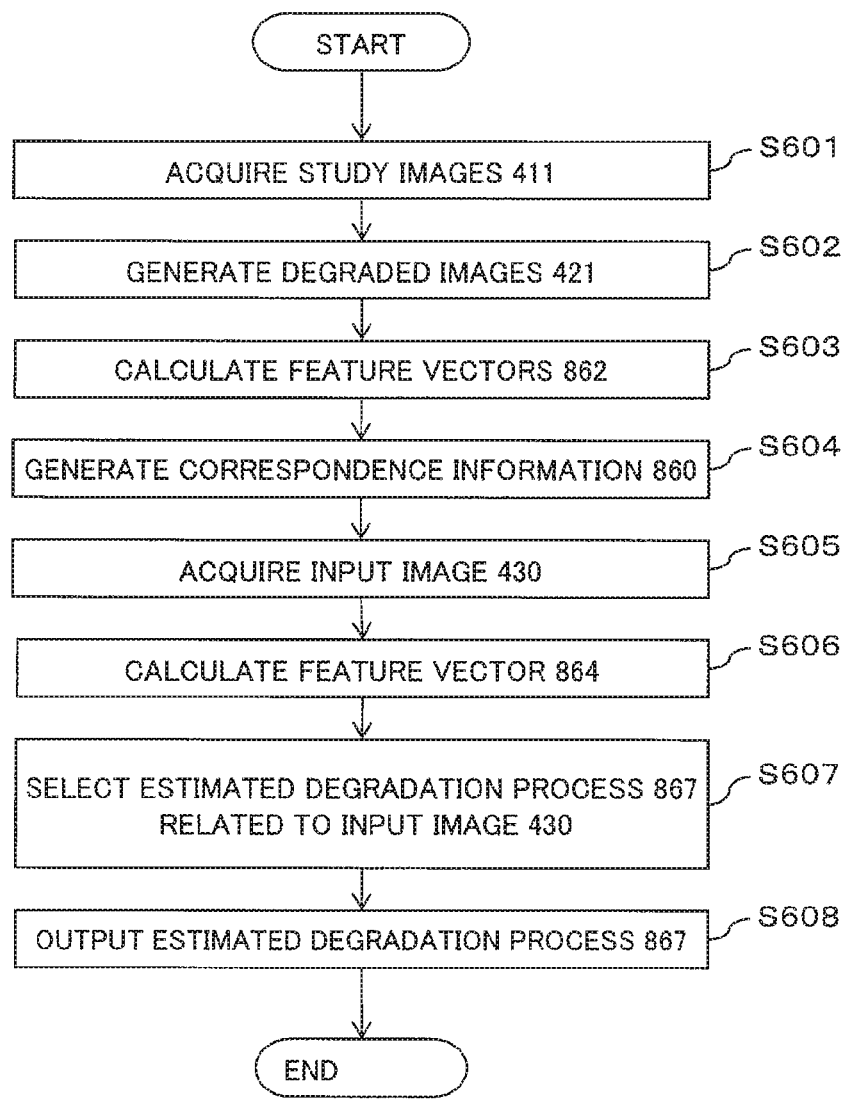
FIG. 7 is a flowchart illustrating an operation of the degradation process estimation device in the first exemplary embodiment.

FIG. 7 is a flowchart illustrating an operation of the present exemplary embodiment. Processing in accordance with the flowchart may be performed on the basis of the afore-described program control by the CPU 701. Step names of the processing are denoted by signs, such as S601.

The image acquisition unit 150 acquires study images 411 (S601). For example, the image acquisition unit 150 reads the study images 411 that have been stored in the storage unit 702 or the storage device 703, illustrated in FIG. 6, in advance. The image acquisition unit 150 may acquire the study images 411 that are input by users through the input unit 704 illustrated in FIG. 6. The image acquisition unit 150 may receive the study images 411 from a not-illustrated device through the communication unit 706 illustrated in FIG. 6. The image acquisition unit 150 may acquire the study images 411 that are recorded in the recording medium 707 through the storage device 703 illustrated in FIG. 6.

Next, with respect to each of the acquired study images 411, the correspondence information generation unit 110 in the estimation unit 160 generates degraded images 421 each of which is related to one of a plurality of degradation processes 861 (S602).

In the processing above, the estimation unit 160 reads degradation processes 861, which have been stored in the storage unit 702 or the storage device 703, illustrated in FIG. 6, in advance. The estimation unit 160 may acquire the degradation processes 861 that are input by users through the input unit 704 illustrated in FIG. 6. The estimation unit 160 may receive the degradation processes 861 from a not-illustrated device through the communication unit 706 illustrated in FIG. 6. The estimation unit 160 may acquire the degradation processes 861 that are recorded in the recording medium 707 through the storage device 703 illustrated in FIG. 6.

Next, the correspondence information generation unit 110 calculates feature vectors 862, which correspond to the respective degraded images 421 (S603).

Next, the correspondence information generation unit 110 generates correspondence information 860, which includes tuples of a degradation process 861 and a feature vector 862, and outputs the generated correspondence information 860 to the degradation process selection unit 120 (S604).

Next, the image acquisition unit 150 acquires an input image 430 (S605). For example, the image acquisition unit 150 acquires the input image 430 that has been stored in the storage unit 702 or the storage device 703, illustrated in FIG. 6, in advance. The image acquisition unit 150 may acquire the input image 430 that is input by a user through the input unit 704 illustrated in FIG. 6. The image acquisition unit 150 may receive the input image 430 from a not-illustrated device through the communication unit 706 illustrated in FIG. 6. The image acquisition unit 150 may acquire the input image 430 that is recorded in the recording medium 707 through the storage device 703 illustrated in FIG. 6.

Next, the degradation process selection unit 120 in the estimation unit 160 calculates a feature vector 864 corresponding to the input image 430 (S606).

Next, the degradation process selection unit 120 selects a degradation process 861 related to the input image 430 from the correspondence information 860 on the basis of relations between the feature vector 864 and the feature vectors 862 included in the correspondence information 860 (S607).

Next, the degradation process selection unit 120 outputs the selected degradation process 861 as an estimated degradation process 867 (S608). For example, the degradation process selection unit 120 transmits the estimated degradation process 867 to the study unit 102 through the communication unit 706 illustrated in FIG. 6. The degradation process selection unit 120 may output the estimated degradation process 867 through the output unit 705 illustrated in FIG. 6. The degradation process selection unit 120 may record the estimated degradation process 867 in the recording medium 707 through the storage device 703 illustrated in FIG. 6.

The above is a description of an operation of the present exemplary embodiment.

Next, a more specific configuration of the present exemplary embodiment will be described.

Figure 8:
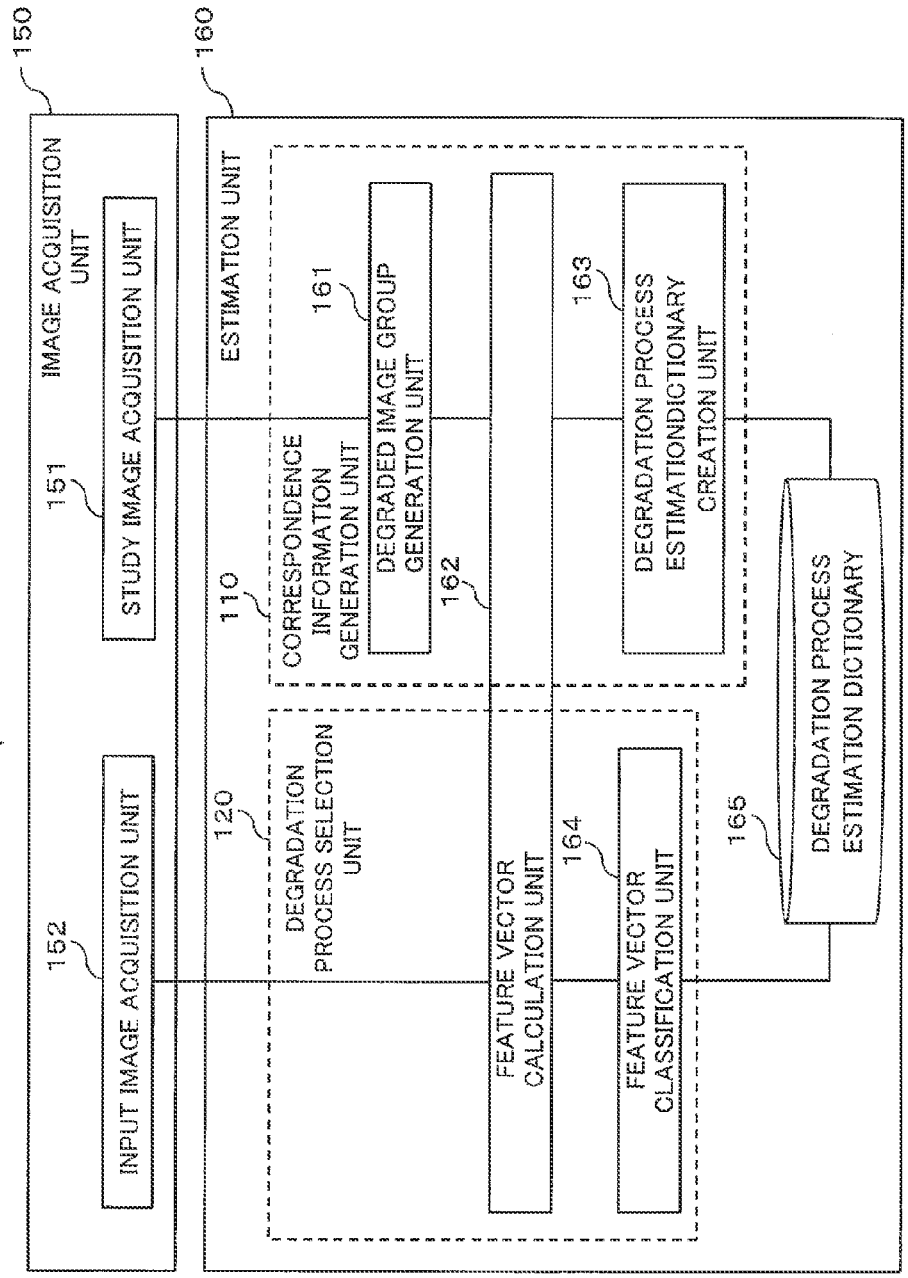
FIG. 8 is a block diagram illustrating an example of a specific configuration of the degradation process estimation device according to the first exemplary embodiment.

FIG. 8 is a diagram illustrating an example of a detailed configuration of the degradation process estimation device 100.

As illustrated in FIG. 8, the image acquisition unit 150 includes a study image acquisition unit 151 and an input image acquisition unit 152. The estimation unit 160 includes the correspondence information generation unit 110, the degradation process selection unit 120, and a degradation process estimation dictionary 165. A degraded image group generation unit 161, a feature vector calculation unit 162, and a degradation process estimation dictionary creation unit 163 constitute the correspondence information generation unit 110. The feature vector calculation unit 162 and a feature vector classification unit 164 constitute the degradation process selection unit 120.

Further, the degradation process estimation dictionary 165 corresponds to the correspondence information 860. The degradation process estimation dictionary 165 is stored in, for example, the storage unit 702, the storage device 703, illustrated in FIG. 6, or the like.

An operation of the degradation process estimation device 100 having the configuration illustrated in FIG. 8 will be described along the flowchart illustrated in FIG. 7.

The study image acquisition unit 151 acquires study images 411 (S601).

Next, with respect to each of the study images 411 that the study image acquisition unit 151 has acquired, the degraded image group generation unit 161, on the basis of a plurality of degradation processes 861, generates degraded images 421 each of which is related to one of the plurality of degradation processes 861 (S602).

Next, the feature vector calculation unit 162 calculates feature vectors 862 that is related to the degraded images 421, which the degraded image group generation unit 161 has generated (S603).

Next, the degradation process estimation dictionary creation unit 163 generates correspondence information 860 that includes tuples of a feature vector 862 and a degradation process 861, and writes the generated correspondence information 860 in the degradation process estimation dictionary 165 (S604). The feature vectors 862 mentioned above are the feature vectors 862 that the feature vector calculation unit 162 has created in S603. The degradation processes 861 mentioned above are the degradation processes 861 that the feature vector calculation unit 162 has used to create the feature vectors 862 in S603.

Next, the input image acquisition unit 152 acquires an input image 430 (S605).

Next, the feature vector calculation unit 162 calculates a feature vector 864 (S606).

Next, the feature vector classification unit 164 classifies the feature vector 864 calculated by the feature vector calculation unit 162 into any one of the afore-described classes on the basis of relations to the feature vectors 862 included in the correspondence information 860, which is stored in the degradation process estimation dictionary 165. Subsequently, the feature vector classification unit 164 selects a degradation process 861 that is related to the class into which the feature vector 864 has been classified (S607).

Next, the feature vector classification unit 164 outputs the selected degradation process 861 as an estimated degradation process 867 (S608).

A first advantageous effect in the above-described present exemplary embodiment is that it becomes possible to estimate a degradation process of the input image 430 accurately and obtain the dictionary 103 required to restore a desired restored image 440 from the input image 430.

That is because the present exemplary embodiment includes the following configuration. That is, first, the image acquisition unit 150 acquires the study images 411 and the input image 430. Second, the estimation unit 160 outputs a selected degradation process 861 as the estimated degradation process 867 on the basis of relations between the feature vector 864 and the feature vectors 862.

A second advantageous effect in the above-described present exemplary embodiment is that it becomes possible to estimate a degradation process of the input image 430 accurately even for degradation including a blur.

That is because the estimation unit 160 is configured to generate the feature vectors 862 and the feature vector 864 that have a structure in which the absolute values of Fourier transformed quantities of an original degraded image 421 or the logarithmic values of the absolute values are arranged in raster scan order. Alternatively, that is because the estimation unit 160 is configured to generate the feature vectors 862 and the feature vector 864 that have a structure in which the respective pixel values of a degraded image 421, which are normalized with respect to luminance, are arranged in raster scan order.

A third advantageous effect in the above-described present exemplary embodiment is that it becomes possible to increase a probability with which an estimated degradation process is accurate to a higher level.

That is because the degradation process selection unit 120 is configured to classify the feature vector 864 into a plurality of classes and output the estimated degradation processes 867 that are related to respective ones of the plurality of classes.

<<<First Variation of First Exemplary Embodiment>>>

Figure 9:
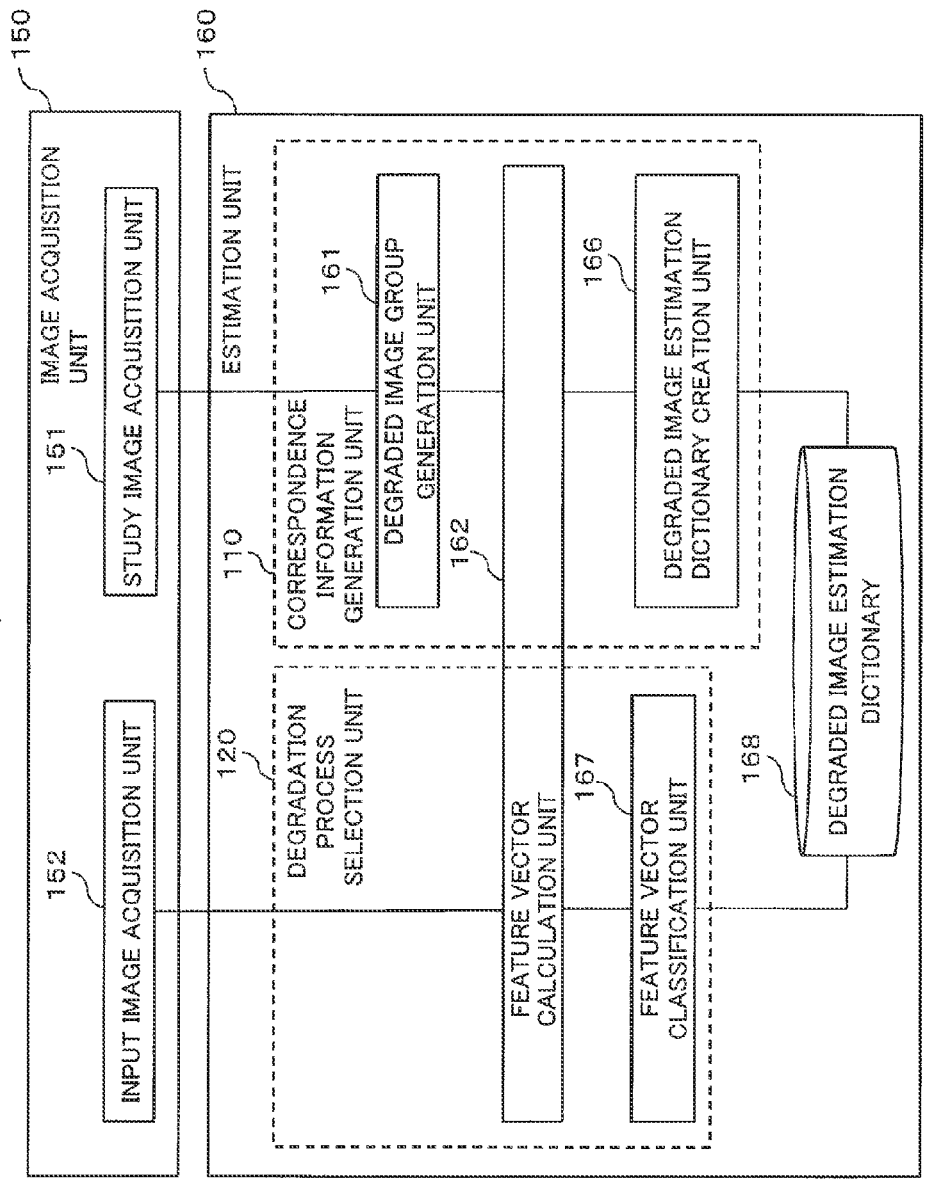
FIG. 9 is a block diagram illustrating an example of a specific configuration of a degradation process estimation device according to a first variation of the first exemplary embodiment.

FIG. 9 is a diagram illustrating an example of a detailed configuration of a degradation process estimation device 100 in a first variation of the present exemplary embodiment.

As illustrated in FIG. 9, an estimation unit 160 of the present variation includes a degraded image estimation dictionary creation unit 166 in place of the degradation process estimation dictionary creation unit 163. The estimation unit 160 of the present variation also includes a feature vector classification unit 167 in place of the feature vector classification unit 164. The estimation unit 160 of the present variation also includes a degraded image estimation dictionary 168 in place of the degraded image estimation dictionary 165.

The degradation process estimation device 100 of the present variation outputs a selected degraded image 421 as an estimated degradation process 867 in place of a degradation process 861. That is, the estimation unit 160 of the present variation selects any one of degraded images 421 on the basis of similarities 851, and outputs the selected degraded image 421 as the estimated degradation process 867.

The degradation process estimation dictionary creation unit 166 generates correspondence information that includes tuples of a feature vector 862 created by a feature vector calculation unit 162 and a degraded image 421 related to the feature vector 862, and writes the generated correspondence information in the degraded image estimation dictionary 168.

The degraded image estimation dictionary 168 stores the correspondence information including tuples of a feature vector 862 and a degraded image 421.

The feature vector classification unit 167, for example, outputs a degraded image 421 related to a feature vector 862 that is the nearest neighbor of a feature vector 864. The feature vector classification unit 167 may output k (k is an arbitrary natural number equal to or greater than 1) degraded images 421 each being related to feature vectors 862 that are k-nearest neighbors of the feature vector 864.

Specifically, the feature vector classification unit 167 classifies the feature vector 864 into any one of the afore-described classes on the basis of relations to the feature vectors 862 that are included in the correspondence information, which is stored in the degraded image estimation dictionary 168. Next, the feature vector classification unit 167 outputs a degraded image 421 that is related to the class into which the feature vector 864 has been classified (for example, the centroid of the class). Alternatively, the feature vector classification unit 167 may classify the feature vector 864 into k-nearest neighbor classes on the basis of relations to the feature vectors 862. In this case, the feature vector classification unit 167 may output degraded images 421 each being related to the k classes.

For example, the degradation process estimation device 100 of the present variation outputs degraded images 421 with respect to study images 411 in an overlap of a set of study images 411 with a set of study images 410.

The above-described present variation has an advantageous effect in that generation processing of degraded images 420 in the study unit 102 can be omitted.

<<<Second Variation of First Exemplary Embodiment>>>

Figure 10:
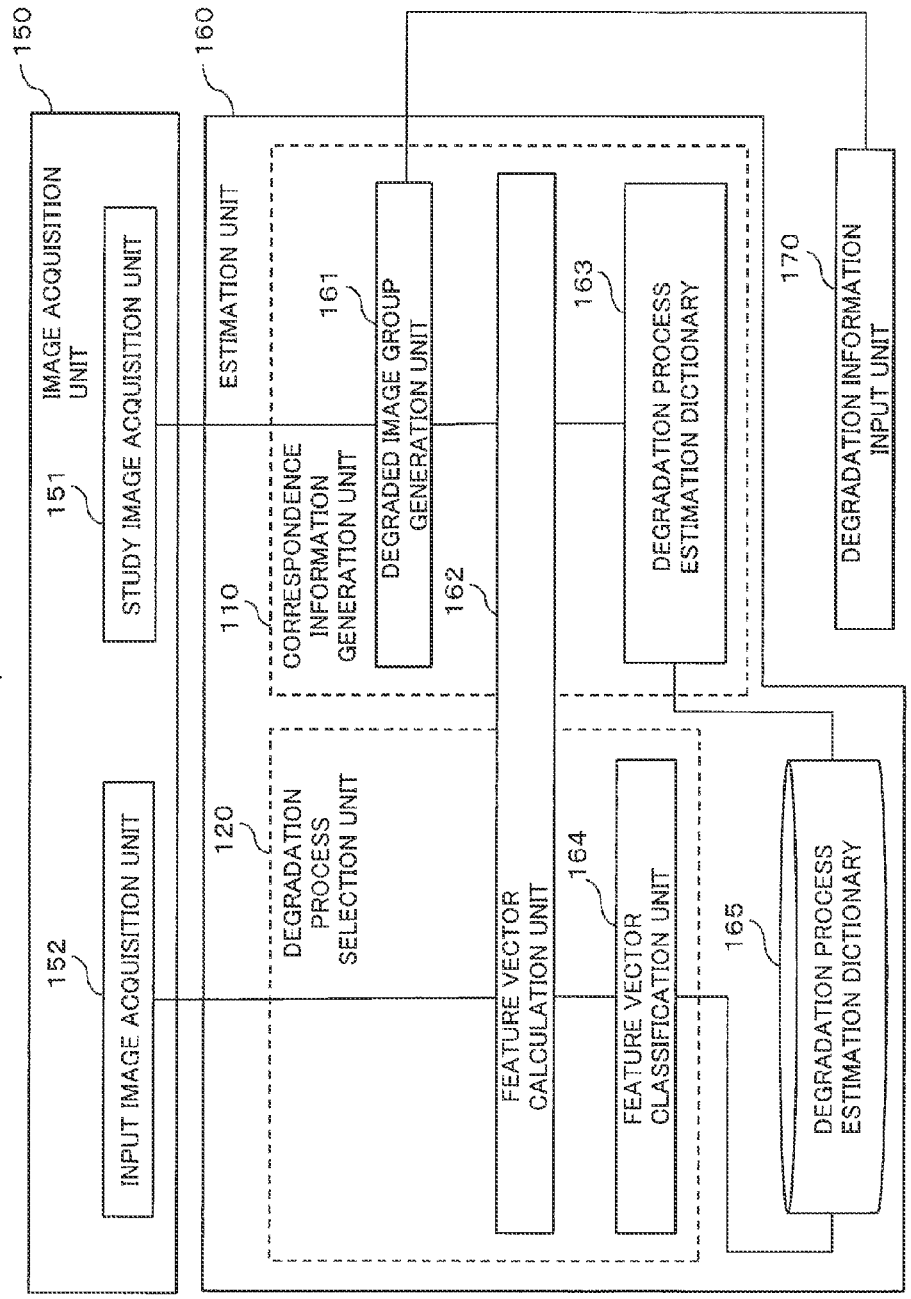
FIG. 10 is a block diagram illustrating an example of a specific configuration of a degradation process estimation device according to a second variation of the first exemplary embodiment.

FIG. 10 is a diagram illustrating an example of a detailed configuration of a degradation process estimation device 100 in a second variation of the present exemplary embodiment.

As illustrated in FIG. 10, the degradation process estimation device 100 of the present variation further includes a degradation information input unit 170.

===Degradation Information Input Unit 170===

The degradation information input unit 170 allows a user to input degradation information of an input image 430.

Figure 11:
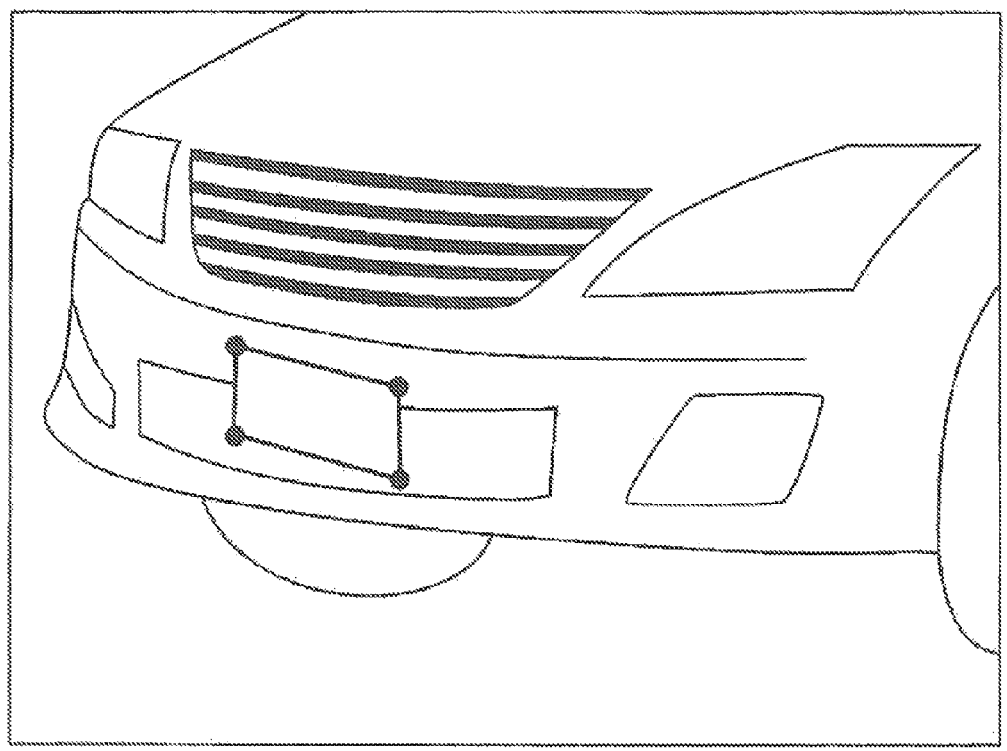
FIG. 11 is a diagram illustrating an example of degradation information in the second variation of the first exemplary embodiment.
Figure 12:
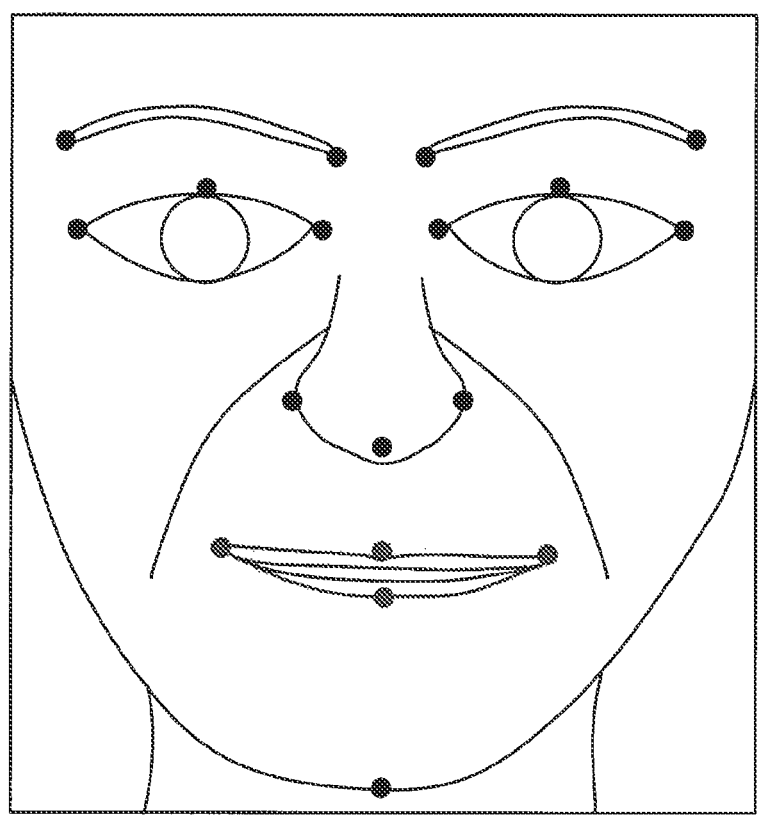
FIG. 12 is a diagram illustrating another example of the degradation information in the second variation of the first exemplary embodiment.

Each of FIGS. 11 and 12 is a diagram illustrating an example of such degradation information. FIG. 11 illustrates four vertices of a license plate, which are degradation information, with black dots. FIG. 12 illustrates feature points of a face, which are degradation information, with black dots. The degradation information is not limited to the examples illustrated in FIGS. 11 and 12, and may be, for example, information specifying the outline of a specific region.

For example, the degradation information input unit 170 allows a user to input degradation information of the input image 430 by the following procedure. First, the degradation information input unit 170 displays the input image 430 on the output unit 705 illustrated in FIG. 6. Second, the user specifies vertex positions or the positions of feature points in the displayed input image 430 through the input unit 704 illustrated in FIG. 6. Third, the degradation information input unit 170 acquires the input positions through the input unit 704.

Degradation information that a user inputs is not limited to vertex positions or feature points. For example, a user may, instead of specifying points, specifies degradation information by lines, or specifies degradation information by surfaces or regions.

===Estimation Unit 160===

With respect to each of study images 411 that a study image acquisition unit 151 has acquired, a degraded image group generation unit 161 in an estimation unit 160 of the present variation, on the basis of not only a plurality of degradation processes 861 but also the degradation information, generates degraded images 421 each of which is related to one of the plurality of degradation processes 861.

The above-described present variation has an advantageous effect in that it is possible to reduce a load on generation processing of degraded images 421 in the estimation unit 160.

That is, by allowing a user to input information of points to determine a posture as described above, it becomes unnecessary to solve problems of estimating a posture, determining a magnification, detecting an object (for example, a license plate or a face) of super-resolution processing, and so on.

Second Exemplary Embodiment

Next, a second exemplary embodiment of the present invention will be described in detail with reference to the accompanying drawings. Hereinafter, within a range not to obscure the description of the present exemplary embodiment, descriptions of portions overlapping the earlier description will be omitted.

The present exemplary embodiment is an exemplary embodiment when the arbitrary region is a local region. In the following description, an arbitrary region in an input image 430 will be referred to as an input image local region.

In the present exemplary embodiment, degraded images 421 are degraded local regions when local regions in study images 411 are degraded on the basis of respective ones of a plurality of degradation processes 861. The local regions in study images 411 mentioned above correspond to local regions that are the input image local regions.

The degradation processes 861 of the present exemplary embodiment are degradation processes each of which discriminates a process of degradation from a local region in a study image 411 to a local region in a degraded image 421.

Feature vectors 862 of the present exemplary embodiment are feature vectors of degraded images 421, which are degraded local regions.

A feature vector 864 of the present exemplary embodiment is a feature vector of an input image local region.

Each of the input image local region, the degraded images 421, which are degraded local regions, local regions in an after-mentioned study image 410, and local regions in an after-mentioned input image 430 are local regions that have corresponding positions and shapes. The local regions are local regions specified in, for example, units of patches.

Figure 13:
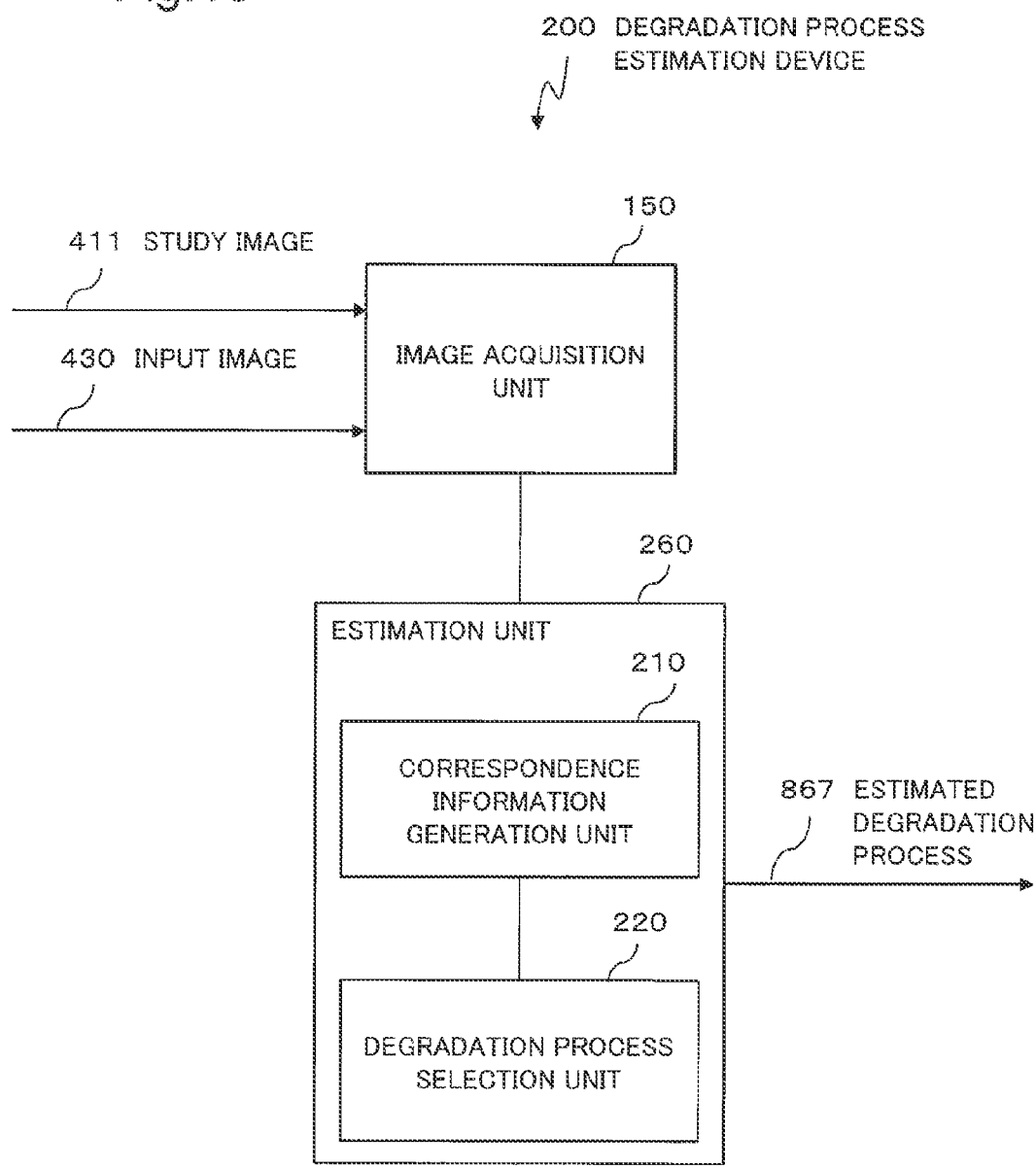
FIG. 13 is a block diagram illustrating a configuration of a degradation process estimation device according to a second exemplary embodiment of the present invention.

FIG. 13 is a block diagram illustrating a configuration of a degradation process estimation device 200 according to the second exemplary embodiment of the present invention.

As illustrated in FIG. 13, the degradation process estimation device 200 in the present exemplary embodiment includes an estimation unit 260 in place of the estimation unit 160.

The estimation unit 260 includes a correspondence information generation unit 210 and a degradation process selection unit 220.

===Correspondence Information Generation Unit 210===

The correspondence information generation unit 210 generates degraded images 421 on the basis of a region specification 871 that includes, for example, an arbitrary number of patch identifiers (identifiers that identify individual patches). Next, the correspondence information generation unit 210 calculates feature vectors 862 that are related to respective ones of the degraded images 421. The correspondence information generation unit 210 acquires the region specification 871 that has been stored in, for example, the storage unit 702 or the storage device 703, illustrated in FIG. 6, in advance. The correspondence information generation unit 210 may acquire the region specification 871 that is input by a user through the input unit 704 illustrated in FIG. 6. The correspondence information generation unit 210 may receive the region specification 871 from a not-illustrated device through the communication unit 706 illustrated in FIG. 6. The correspondence information generation unit 210 may acquire the region specification 871 that is recorded in a recording medium 707 through the storage device 703 illustrated in FIG. 6.

===Degradation Process Selection Unit 220===

The degradation process selection unit 220 generates the input image local regions on the basis of the region specification 871 that is acquired by the correspondence information generation unit 210. Next, the degradation process selection unit 220 calculates feature vectors 864 that are related to the input image local regions.

The degradation process selection unit 220 selects a degradation process 861 from correspondence information 860 on the basis of similarities 851 between the feature vectors 864 and the feature vectors 862 included in the correspondence information 860.

Next, the degradation process selection unit 220 outputs the selected degradation process 861 to the outside (for example, the after-mentioned study unit 202) as an estimated degradation process 867.

In other words, the degradation process estimation device 200 outputs an estimated degradation process 867 that is related to the local region.

Figure 14:
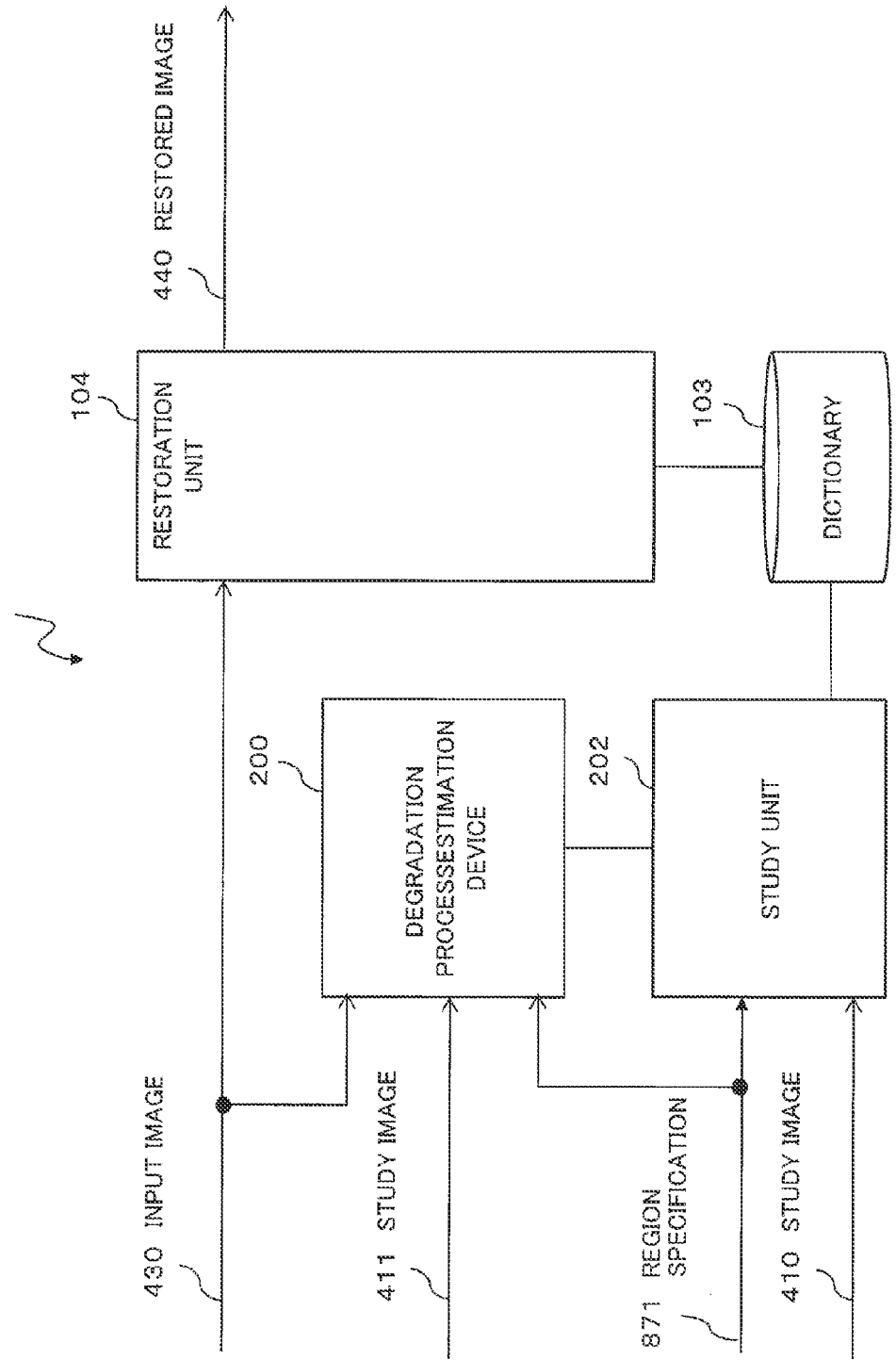
FIG. 14 is a block diagram illustrating a configuration of an image processing system that includes the degradation process estimation device according to the second exemplary embodiment.

FIG. 14 is a block diagram illustrating a configuration of an image processing system 201 that includes the degradation process estimation device 200 according to the present exemplary embodiment. The image processing system 201 is also referred to as an information processing device.

As illustrated in FIG. 14, the image processing system 101 according to the present exemplary embodiment includes the degradation process estimation device 200, the study unit 202, the dictionary 103, and the restoration unit 104.

The study unit 202 acquires study images 410, which are, for example, input from the outside, the estimated degradation process 867 input from the degradation process estimation device 200, and the region specification 871. The study unit 202 generates the dictionary 103 from the study images 410 on the basis of the estimated degradation process 867 and the region specification 871. Specifically, first, the study unit 202 generates degraded images 420 that correspond to the local regions in respective ones of the study images 410 on the basis of the estimated degradation process 867 and the region specification 871. Second, the study unit 202 generates the dictionary 103 that includes patches in the study images 410 and patches in the corresponding degraded images 420 in pairs.

A first advantageous effect of the above-described present exemplary embodiment is the same as the advantageous effect of the first exemplary embodiment. Further, a second advantageous effect of the present exemplary embodiment is that, even when degradations with different details occur with respect to each local region in the input image 430, it becomes possible to estimate accurate degradation processes 861 and obtain the dictionary 103 that is required to restore an accurate super-resolution image (restored image 440).

The reason for the second advantageous effect is that the degradation process estimation device 200 is configured to further output the estimated degradation processes 867 each of which is related to one of the input image local regions, which are local regions in the input image 430, on the basis of the region specification 871.

The present exemplary embodiment may be combined with the first exemplary embodiment. That is, the combined exemplary embodiment may have a configuration that includes both a means processing the whole of each image and a means processing respective local regions in each image.

Third Exemplary Embodiment

Next, a third exemplary embodiment of the present invention will be described in detail with reference to the accompanying drawings. Hereinafter, within a range not to obscure the description of the present exemplary embodiment, descriptions of portions overlapping the earlier description will be omitted.

Figure 15:
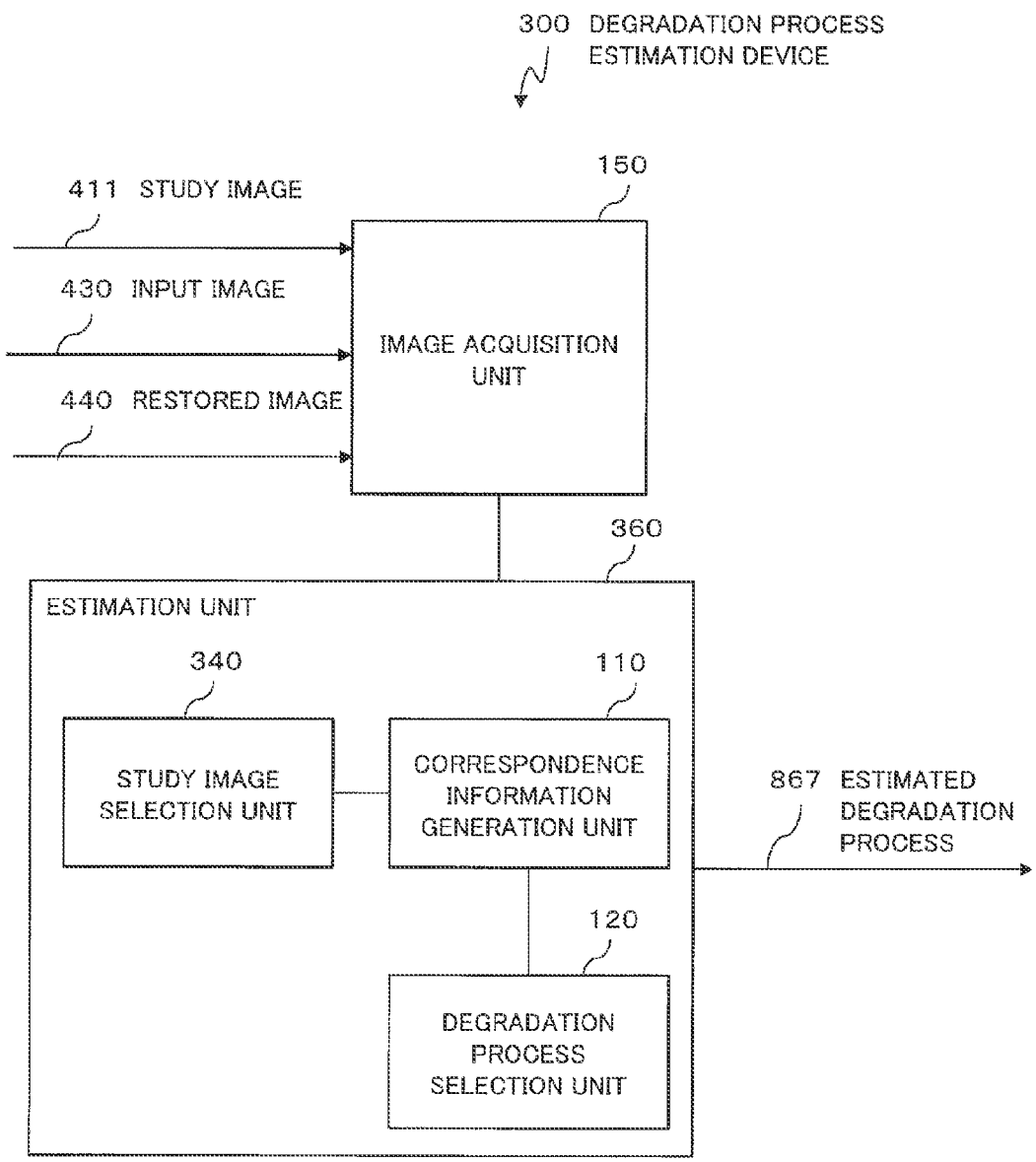
FIG. 15 is a block diagram illustrating a configuration of a degradation process estimation device according to a third exemplary embodiment of the present invention.

FIG. 15 is a block diagram illustrating a configuration of a degradation process estimation device 300 according to the third exemplary embodiment of the present invention.

As illustrated in FIG. 15, the degradation process estimation device 300 in the present exemplary embodiment further includes a study image selection unit 340, compared with the degradation process estimation device 100 of the first exemplary embodiment.

Figure 16:
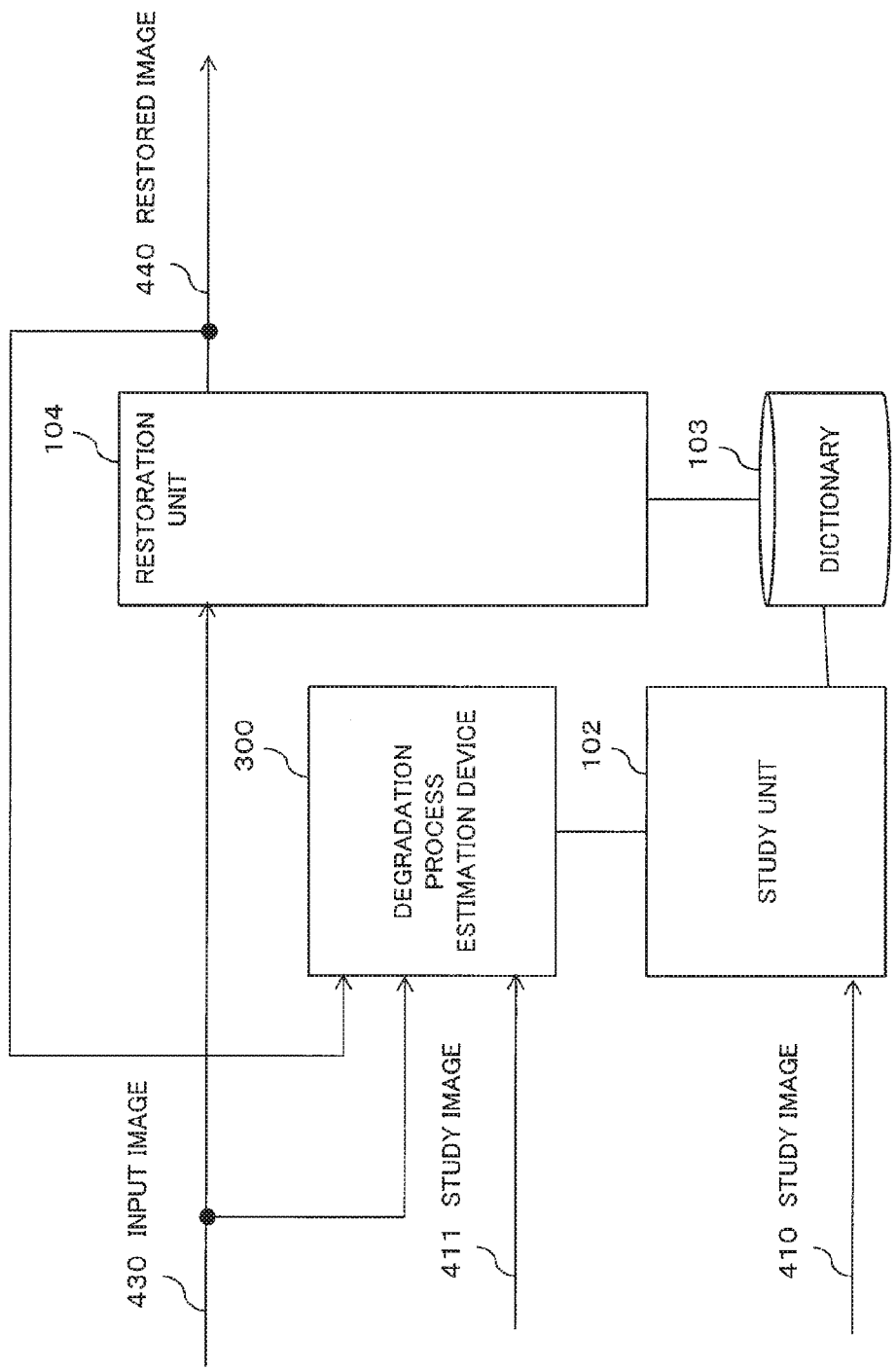
FIG. 16 is a block diagram illustrating a configuration of an image processing system that includes the degradation process estimation device according to the third exemplary embodiment.

FIG. 16 is a block diagram illustrating a configuration of an image processing system 301 that includes the degradation process estimation device 300 according to the present exemplary embodiment. The image processing system 301 is also referred to as an information processing device.

As illustrated in FIG. 16, the image processing system 301 according to the present exemplary embodiment includes the degradation process estimation device 300, the study unit 102, the dictionary 103, and the restoration unit 104. The degradation process estimation device 300 includes the image acquisition unit 150 and an estimation unit 360. The estimation unit 360 further includes the study image selection unit 340, compared with the estimation unit 160 of the first exemplary embodiment.

===Study Image Selection Unit 340===

The study image selection unit 340 selects a study image 411 on the basis of similarities (second similarities) 852 between respective ones of the study images 411 and a restored image 440, and outputs the selected study image 411 to a correspondence information generation unit 110. The restored image 440 mentioned above is an image generated by the restoration unit 104.

Figure 17:
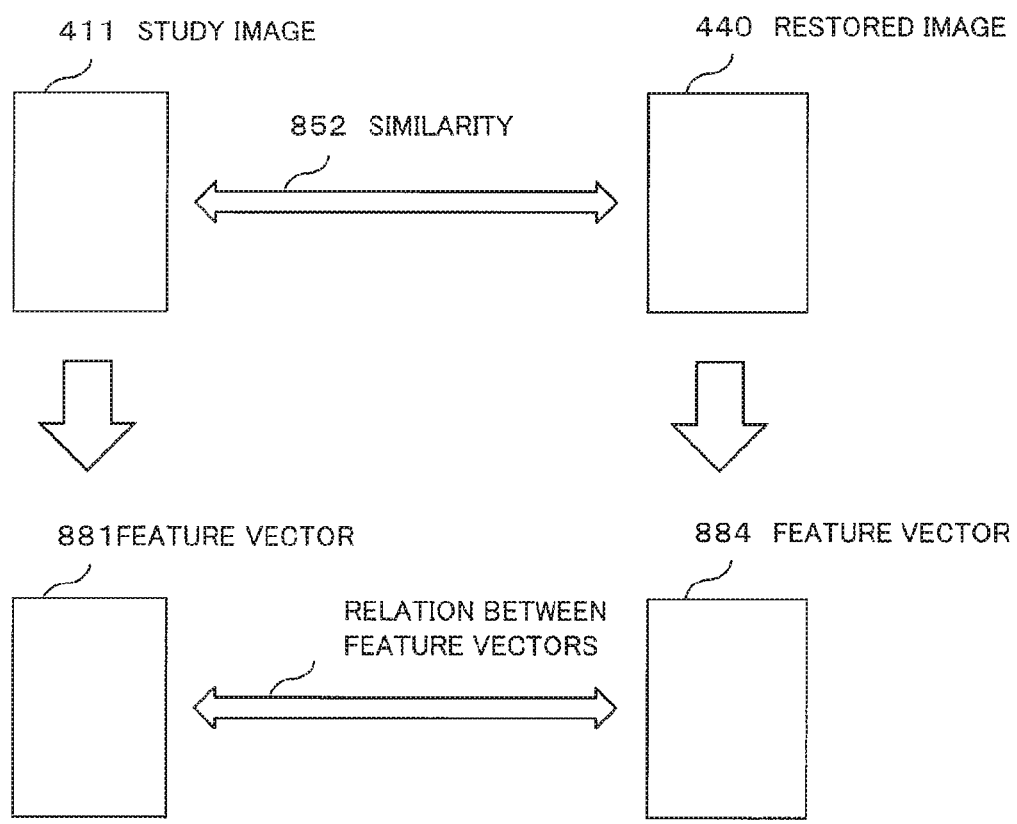
FIG. 17 is a diagram illustrating relations between a study image, a restored image, and a similarity in the third exemplary embodiment.
Figure 18:
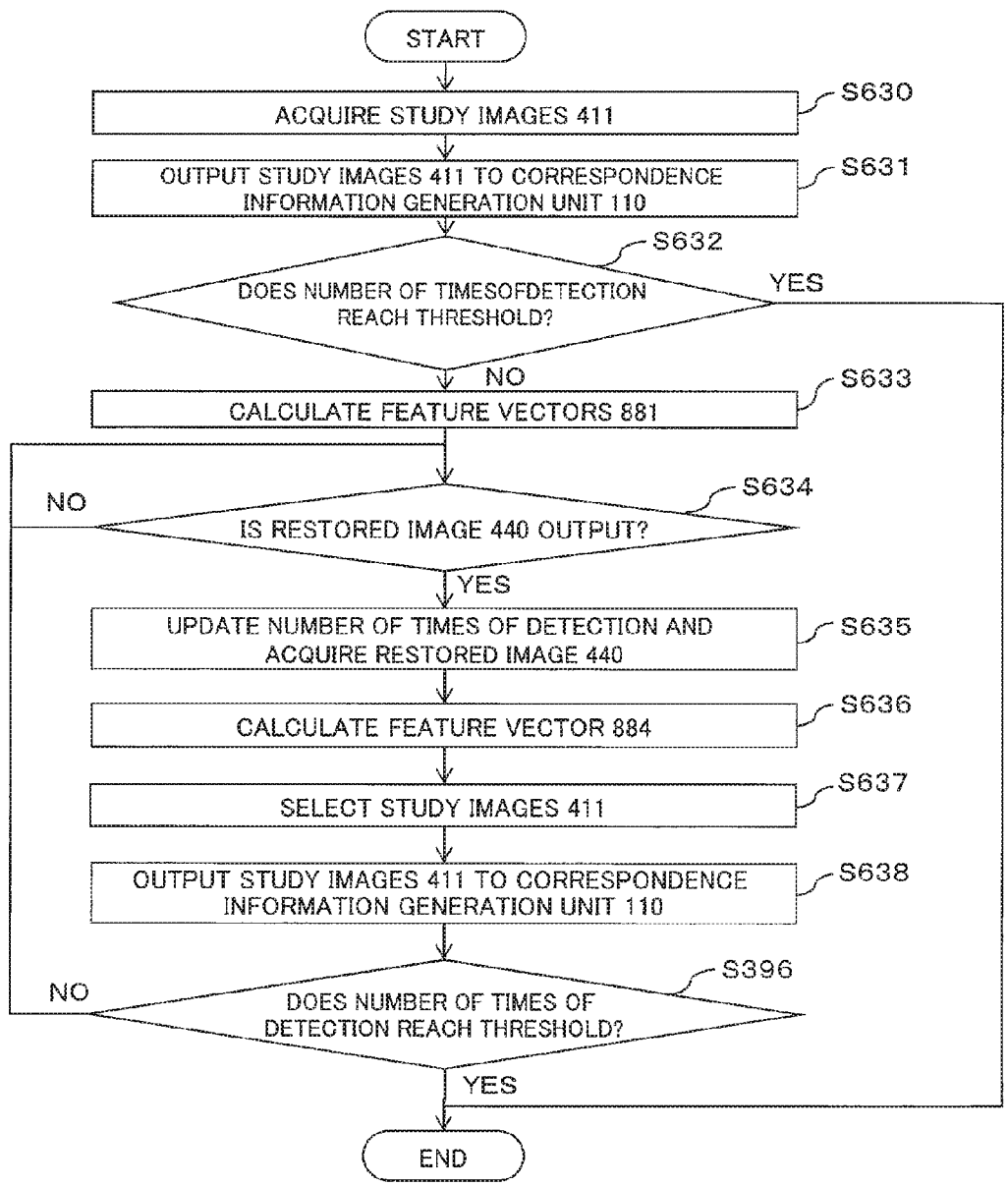
FIG. 18 is a flowchart illustrating an operation of a study image selection unit in the third exemplary embodiment.

Next, with reference to FIGS. 17 and 18, an operation of the study image selection unit 340 will be described. FIG. 17 is a diagram illustrating relations among a study image 411, a restored image 440, and a similarity 852. FIG. 18 is a flowchart illustrating an operation of the present exemplary embodiment.

The study image selection unit 340 acquires a plurality of study images 411 (S630).

Next, the study image selection unit 340 outputs the acquired study images 411 to the correspondence information generation unit 110 (S631).

Next, the study image selection unit 340 determines whether or not the number of times in which the study image selection unit 340 detects the output of a restored image 440

(hereinafter, referred to as the number of times of detection) reaches a preset threshold value (S632). When the number of times of detection reaches the preset threshold value (YES in S632), the study image selection unit 340 ends the processing.

When the number of times of detection does not reach the preset threshold value (NO in S632), the study image selection unit 340 calculates feature vectors 881 that are related to respective ones of the study images 411 (S633).

Next, the study image selection unit 340 waits for the restoration unit 104 to output a restored image 440 (S634).

When the restoration unit 104 outputs a restored image 440 (YES in S634), the study image selection unit 340 updates the number of times of detection and acquires the restored image 440 (S635).

Next, the study image selection unit 340 calculates a feature vector 884 related to the restored image 440 (S636).

Next, the study image selection unit 340 selects a study image 411 on the basis of relations between the feature vectors 881 and the feature vector 884 (S637).

For example, when the number of restored images 440 is one, the study image selection unit 340 selects study images 411 each being related to a preset number of feature vectors 881 in ascending order of distances between respective ones of the feature vectors 881 and the feature vector 884. When the number of restored images 440 is one, the study image selection unit 340 may select study image 411 each being related to feature vectors 881 the distances of which from the feature vector 884 are equal to or less than a preset threshold value.

For example, when the number of restored images 440 is plural, the study image selection unit 340 selects study images 411 each being related to a preset number of feature vectors 881 in ascending order of distances between respective ones of the feature vectors 881 and a vector corresponding to the centroid of a plurality of feature vectors 884. When the number of restored images 440 is plural, the study image selection unit 340 may select study images 411 each being related to feature vectors 881 the distances of which from a vector corresponding to the centroid of a plurality of feature vectors 884 are equal to or less than a preset threshold value. When the number of restored images 440 is plural, the study image selection unit 340 may, with respect to each feature vector 884, select study images 411 each being related to a preset number of feature vectors 881 in ascending order of distances between respective ones of the feature vectors 881 and the feature vector 884. When the number of restored images 440 is plural, the study image selection unit 340 may, with respect to each feature vector 884, select study images 411 each being related to feature vectors 881 the distances of which from the feature vector 884 are equal to or less than a preset threshold value.

Next, the study image selection unit 340 outputs the selected study images 411 to the correspondence information generation unit 110 (S638).

Next, the study image selection unit 340 determines whether or not the number of times of detection reaches the preset threshold value (S639). When the number of times of detection reaches the preset threshold value (YES in S639), the study image selection unit 340 ends the processing. When the number of times of detection does not reaches the predetermined threshold value (NO in S639), the study image selection unit 340 returns to the processing in S634.

===Correspondence Information Generation Unit 110===

The correspondence information generation unit 110 of the present exemplary embodiment generates correspondence information 860 on the basis of the study images 411 acquired from the study image selection unit 340, and outputs the generated correspondence information 860 to the degradation process selection unit 120.

===Study Unit 102===

The study unit 102 creates the dictionary 103 that stores a plurality of patch pairs each of which associates a degraded patch that is a patch in a degraded image 420 with a restored patch that is a patch in a study image 410. Patches in each degraded image 420 are patches in the degraded image 420 into which a study image 410 is degraded on the basis of an estimated degradation process 867, which is output by the degradation process estimation device 300.

Figure 19:
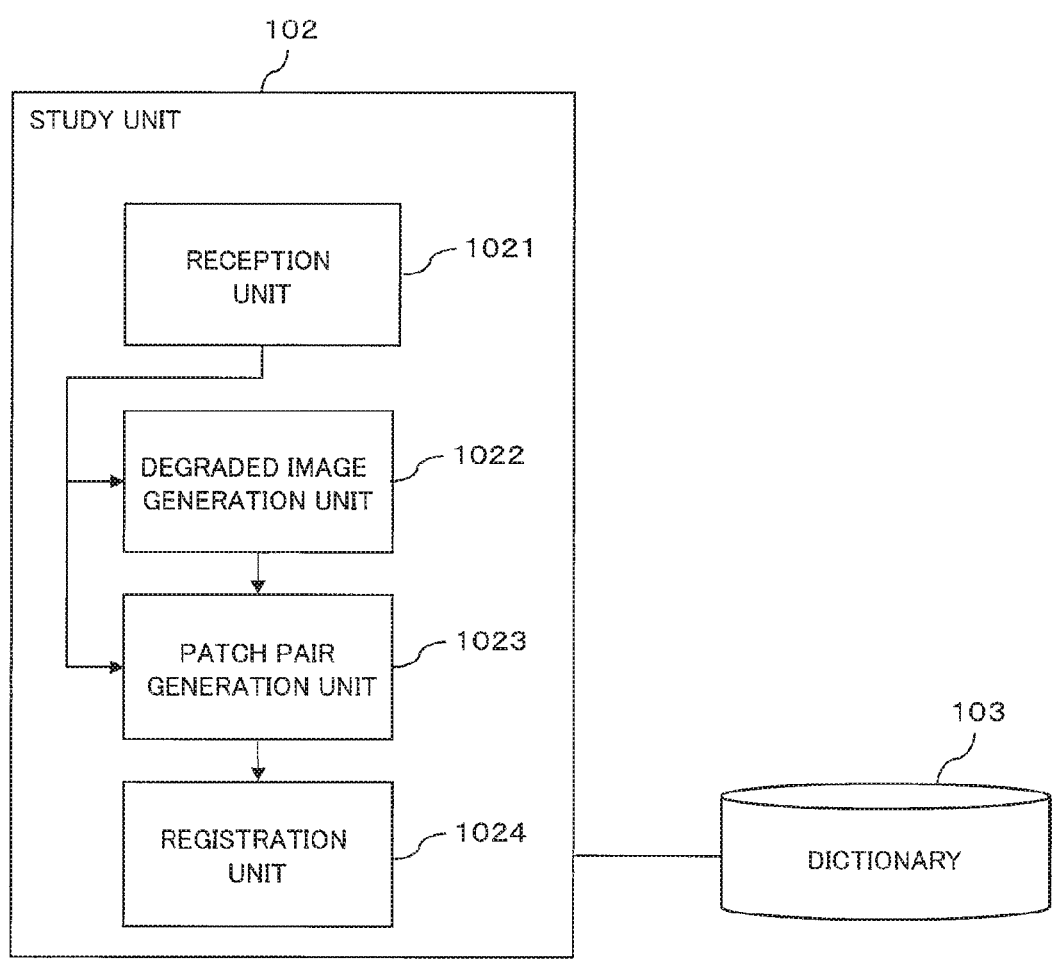
FIG. 19 is a block diagram illustrating a configuration of a study unit in the third exemplary embodiment.

FIG. 19 is a block diagram illustrating a structure of the study unit 102. As illustrated in FIG. 19, the study unit 102 includes a reception unit 1021, a degraded image generation unit 1022, a patch pair generation unit 1023, and a registration unit 1024.

FIG. 20 is a conceptual diagram for a description of a study phase. As illustrated in FIG. 20, the study unit 102 applies degradation processing to the study images 410 on the basis of the estimated degradation process 867 to generate the degraded images 420. The study unit 102 registers, in the dictionary 103, patch pairs 403 each of which includes patches at corresponding positions in a study image 410 and a degraded image 420. Each patch pair 403 includes a restored patch 401 and a degraded patch 402.

===Reception Unit 1021===

The reception unit 1021 receives the input of the study images 410. The reception unit 1021 outputs the received study images 410 to the degraded image generation unit 1022 and the patch pair generation unit 1023.

===Degraded Image Generation Unit 1022===

The degraded image generation unit 1022 applies degradation processing to the study images 410 output from the reception unit 1021 on the basis of the estimated degradation process 867 output from the degradation process estimation device 200 to generate the degraded images 420.

When a plurality of estimated degradation processes 867 exist, the degraded image generation unit 1022 may apply degradation processing to each of the study images 410 output from the reception unit 1021 on the basis of the respective estimated degradation processes 867 to generate a plurality of degraded images 420 corresponding to each of the study image 410.

The degraded image generation unit 1022, for example, reduces a study image 410 to one N-th of the original size thereof on the basis of the estimated degradation process 867 to generate a degraded image 420. As an algorithm to reduce an image, for example, a nearest neighbor method, in which image degradation is comparatively substantial, is used. As an algorithm to reduce an image, for example, a bi-linear method and a bi-cubic method may also be used.

The degraded image generation unit 1022 may increase the intensity of blurs of a study image 410 through, for example, removing high frequency components thereof on the basis of the estimated degradation process 867 to generate a degraded image 420. The degraded image generation unit 1022 may change a posture of a study image 410 through, for example, tilting the study image 410 on the basis of the estimated degradation process 867 to generate a degraded image 420. Alternatively, the degraded image generation unit 1022 may reduce the luminance of a study image 410 through, for example, decreasing the brightness thereof on the basis of the estimated degradation process 867 to generate a degraded image 420. The degraded image generation unit 1022 may generate a degraded image 420 by various existing methods on the basis of the estimated degradation process 867.

===Patch Pair Generation Unit 1023===

The patch pair generation unit 1023 receives the study images 410 from the reception unit 1021 and the degraded images 420 corresponding to the study images 410 from the degraded image generation unit 1022. The patch pair generation unit 1023 generates a plurality of patch pairs 403 each of which includes patches at corresponding positions in the study image 410 and the degraded image 420. The patch pair generation unit 1023 may generate a plurality of pairs (patch pairs 403) of a restored patch 401 and a degraded patch 402 by an existing method. The patch pair generation unit 1023 outputs the plurality of generated patch pairs 403 to the registration unit 1024.

===Registration Unit 1024===

The registration unit 1024 receives the plurality of patch pairs 403 from the patch pair generation unit 1023. The registration unit 1024 registers the plurality of patch pairs 403 in the dictionary 103.

===Dictionary 103===

The dictionary 103 stores the plurality of patch pairs generated by the study unit 102.

===Restoration Unit 104===

The restoration unit 104 generates a restored image 440 from an input image 430 using the dictionary 103, and outputs the generated restored image 440 to the degradation process estimation device 300 and the outside.

Figure 21:
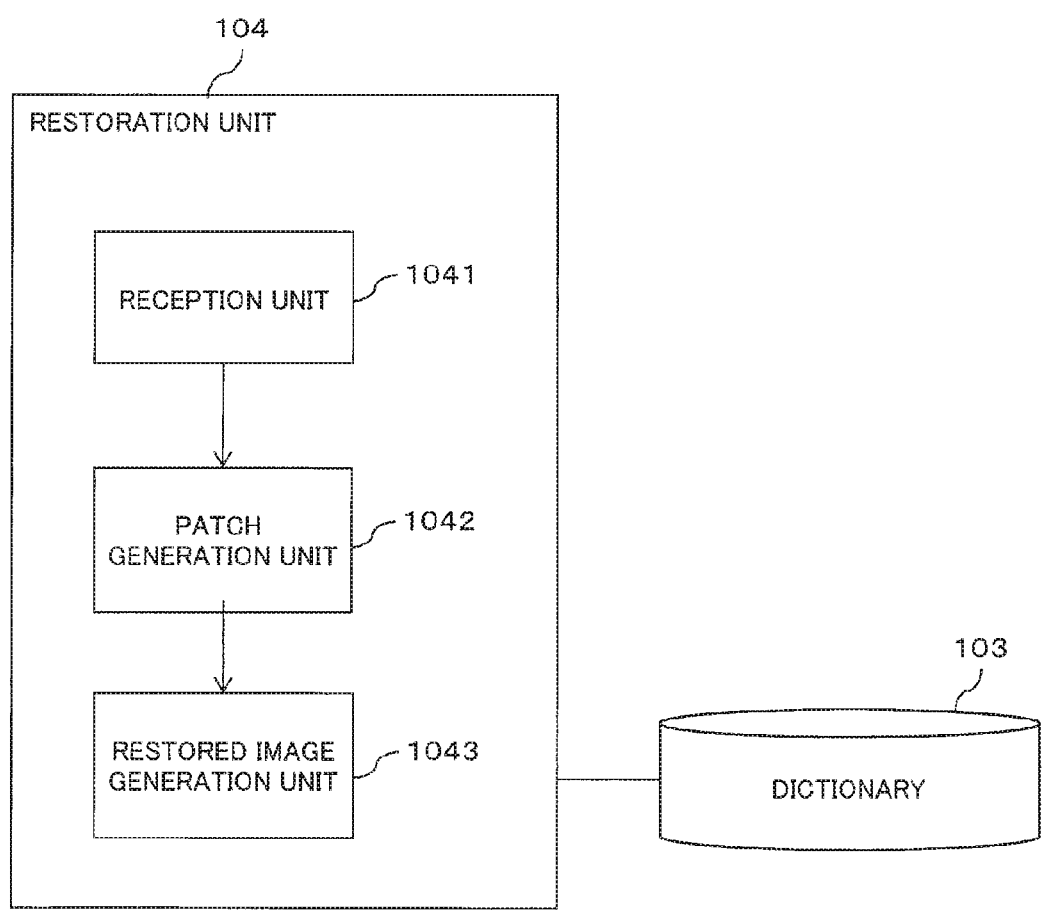
FIG. 21 is a block diagram illustrating a configuration of a restoration unit in the third exemplary embodiment.

FIG. 21 is a block diagram illustrating a configuration of the restoration unit 104. As illustrated in FIG. 21, the restoration unit 104 includes a reception unit 1041, a patch generation unit 1042, and a restored image generation unit 1043.

===Reception Unit 1041===

The reception unit 1041 receives the input image 430 that is an object of image processing from the outside. For example, the reception unit 1041 may connect to a network to receive the input image 430, or read the input image 430 from a memory storing the input image 430 to receive the input image 430. That is, the form of reception of the input image 430 by the reception unit 1041 is not limited to a specific form. The reception unit 1041 outputs the received input image 430 to the patch generation unit 1042.

===Patch Generation Unit 1042===

The patch generation unit 1042 generates a plurality of patches (input patches) from the input image 430 output from the reception unit 1041, and outputs the generated patches to the restored image generation unit 1043.

===Restored Image Generation Unit 1043===

Figure 22:
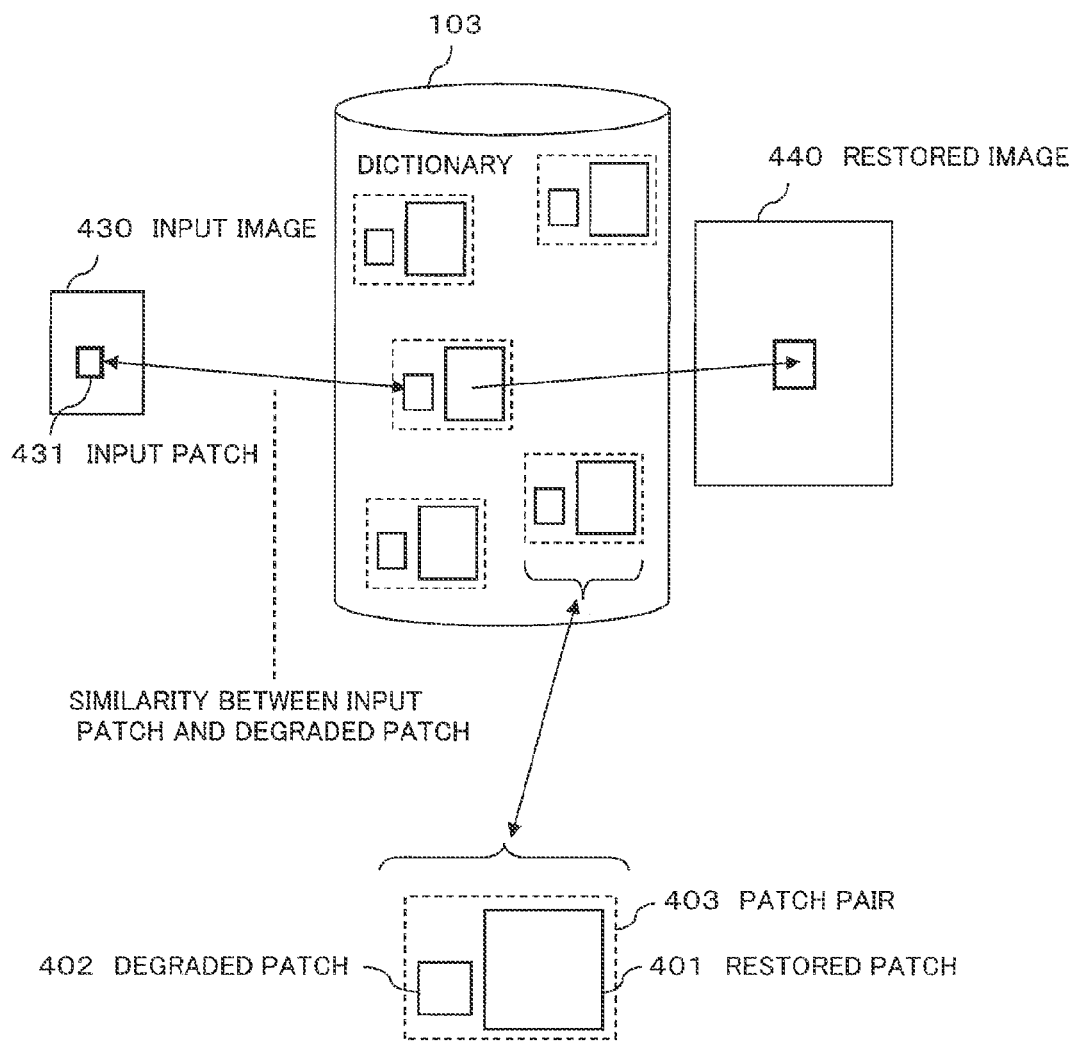
FIG. 22 is a diagram describing generation of a restored image in the third exemplary embodiment.

FIG. 22 is a conceptual diagram for a description of a restoration phase. As illustrated in FIG. 22, the restoration unit 104 selects restored patches 401 on the basis of similarities between the input patches 431 in the input image 430 and the degraded patches 402 in the dictionary 103.

The restored image generation unit 1043 selects a plurality of restored patches 401 which correspond to each of the input patches 431 from within the patch pairs 403 stored in the dictionary 103 on the basis of patch similarities, each of which is a value indicating a similarity between an input patch 431 and a degraded patch 402. For example, the restored image generation unit 1043 selects restored patches 401 paired with degraded patches 402 the patch similarities of which to each input patch 431 are equal to or greater than a preset value. The restored image generation unit 1043 may select a preset number of restored patches 401 paired with degraded patches 402 in descending order of patch similarities to each input patch 431.

The restored image generation unit 1043 composites a plurality of restored patches 401 to generate a restored image 440. Each of the restored patches 401 is one of a plurality of restored patch 401. The plurality of restored patches 401 correspond to each of the input patches 431.

The restored image generation unit 1043 outputs the generated restored image 440 to the degradation process estimation device 300. The restored image generation unit 1043 also outputs the restored image 440 to the outside. For example, the restoration unit 104 transmits the restored image 440 to the outside through the communication unit 706 illustrated in FIG. 6. The restoration unit 104 may output the restored image 440 through the output unit 705 illustrated in FIG. 6. The restoration unit 104 may record the restored image 440 in a recording medium 707 through the storage device 703 illustrated in FIG. 6.

The restoration unit 104 may select restored patches 401 on the basis of similarities between patches cut out from the restored image 440 and the restored patches 401 in addition to similarities between the input patches 431 and the degraded patches 402.

Next, similarities (for example, patch similarities) between images (for example, between input patches 431 and degraded patches 402) will be described.

FIG. 23 is a diagram illustrating an example of a patch 450. As illustrated in FIG. 23, a patch 450, for example, includes a pixel group 451 that is a multidimensional vector having a plurality of pixel values of pixels 452 as elements. The patch 450 also includes, as meta-information, a patch identifier 453 that identifies the patch 450 individually. A patch 450 is a concept that includes a restored patch 401, a degraded patch 402, and an input patch 431. A pixel value may be a brightness value, but is not limited thereto.

In this case, a value indicating a patch similarity between two patches may be a value based on differences in the brightness values of respective pixels 452 between the patches. For example, a value indicating a patch similarity may be a value based on an SSD (Sum of Square Distance), which is a sum of squares of differences in the brightness values of respective pixels 452 between patches. For example, a value indicating a patch similarity may be a value calculated by subtracting an SSD from a specific constant. In this case, the specific constant may, for example, be the SSD between a patch with the lowest brightness and a patch with the highest brightness. Alternatively, a value indicating a patch similarity may be a value based on an SAD (Sum of Absolute Distance), which is a sum of absolute values of differences in the brightness values of respective pixels 452 between patches. For example, a value indicating a patch similarity may be a value calculated by subtracting an SAD from a specific constant. In this case, the specific constant may, for example, be the SAD between a patch with the lowest brightness and a patch with the highest brightness.

In addition, a value indicating a patch similarity may, for example, be a value based on an angle between two feature vectors. Alternatively, a value indicating a patch similarity may be a value calculated by a normalized cross-correlation function, but is not limited thereto.

That is, the patch similarity is a similarity between images that are expressed by the respective pixel groups 451 of two patches. The above description is applied to not only the patch similarities but also the similarities 851 and the similarities 852.

A first advantageous effect of the above-described present exemplary embodiment is the same as the advantageous effect of the first exemplary embodiment. Further, a second advantageous effect of the present exemplary embodiment is that it becomes possible to obtain the dictionary 103 that is required to estimate a degradation process of an input image 430 more accurately and restore a super-resolution image (restored image 440) corresponding to the input image 430 with higher-resolution.

The reason for the second advantageous effect is that a configuration to repeat the following steps is applied. First, the degradation process estimation device 300 outputs an estimated degradation process 867 on the basis of study images 411. Second, the study unit 102 generates the dictionary 103 on the basis of the estimated degradation process 867. Third, the restoration unit 104 generates a restored image 440 on the basis of the dictionary 103. Fourth, the study image selection unit 340 of the degradation process estimation device 300 selects study images 411 on the basis of the restored image 440.

The present exemplary embodiment may be applied to the second exemplary embodiment. That is, local regions in respective images may be treated as processing units.

The respective components described in the above exemplary embodiments are not always required to be individually independent entities. For example, the respective components may be achieved so that a plurality of components is achieved as a single module. The respective components may be achieved so that a single component is achieved as a plurality of modules. The respective components may be configured in such a way that a component is a portion of another component. The respective components may be configured in such a way that a portion of a component overlaps a portion of another component.

The respective components and modules achieving the respective components in the above-described exemplary embodiments may be achieved, if possible, in a form of hardware in accordance with necessity. The respective components and modules achieving the respective components may be achieved by a computer and a program. The respective components and modules achieving the respective components may also be achieved by a mixture of modules in a form of hardware, and a computer and a program.

The program is, for example, provided being recorded in a nonvolatile computer-readable recording medium, such as a magnetic disk and a semiconductor memory, and read by a computer in activating the computer. The read program makes the computer function as the components in the afore-described exemplary embodiments by controlling operations of the computer.

Although, in the exemplary embodiments described above, a plurality of operations are described in sequence in a form of flowchart, the sequence of description does not limit a sequence in which the plurality of operations are performed. Thus, when the exemplary embodiments are carried out, the sequence of the plurality of operations can be changed within a range not affecting the content of the operations.

Further, in the exemplary embodiments described above, a plurality of operations are not limited to being performed at individually different timings. For example, an operation may be initiated while another operations is being performed, and execution timings of an operation and another operation may overlap each other partially or completely.

Further, although the exemplary embodiments described above were described in a manner in which an operation becomes a trigger of another operation, those descriptions do not limit all relations between an operation and another operation. Thus, when the exemplary embodiments are carried out, the relations between a plurality of operations can be changed within a range not affecting the content of the operations. Specific descriptions of the respective operations of the respective components do not limit the respective operations of the respective components. Thus, the respective specific operations of the respective components can be changed within a range not affecting functional, performance, and other features in carrying out the exemplary embodiments.

All or a part of the exemplary embodiments described above may be described as in the following Supplementary Notes, but the present invention is not limited thereto.

(Supplementary Note 1)

An information processing device comprising:

image acquisition means for acquiring a plurality of first study images and an input image; and estimation means for outputting an estimated degradation process on a basis of first similarities between an arbitrary region in the input image and respective ones of a plurality of first degraded images when regions, in the first study images, corresponding to the region are degraded on a basis of respective ones of a plurality of degradation processes, wherein the estimated degradation process corresponds to a degradation process in the degradation processes, the degradation process being related to the region in the input image.

(Supplementary Note 2)

The information processing device according to Supplementary Note 1, wherein, further on a basis of correspondence relations between respective ones of the first degraded images and the degradation processes from the first study images to respective ones of the first degraded images, the estimation means outputs information discriminating the degradation process related to the region in the input image as the estimated degradation process.

(Supplementary Note 3)

The information processing device according to Supplementary Note 1 or 2, wherein the first similarities correspond to relations between feature vectors corresponding to the first degraded images and a feature vector corresponding to the region in the input image.

(Supplementary Note 4)

The information processing device according to Supplementary Note 3, wherein the estimation means outputs the estimated degradation process that corresponds to one of k (k is a natural number equal to or greater than 1) degradation processes of k-nearest neighbors, the k degradation processes being related to the region in the input image.

(Supplementary Note 5)

The information processing device according to any one of Supplementary Notes 1 to 4, further comprising:

study means for creating a dictionary that stores a plurality of patch pairs each of which includes a degraded patch and a restored patch, the degraded patch being a patch in a second degraded image into which a second study image is degraded on a basis of the estimated degradation process, the restored patch being a patch in the second study image;

restoration means for generating a restored image from the input image by using the dictionary, and outputting the generated restored image; and selection means for selecting the first study images on a basis of second similarities between the first study images and the restored image, wherein, further on a basis of the first similarities between respective ones of a plurality of first degraded images into which the regions in the selected first study images are degraded and the region in the input image, the estimation means outputs the estimated degradation process.

(Supplementary Note 6)

The information processing device according to Supplementary Note 5, wherein, further on a basis of correspondence relations between respective ones of the first degraded images and degradation processes from the selected first study images to respective ones of the first degraded images, the estimation means outputs information discriminating the degradation process related to the region in the input image as the estimated degradation process.

(Supplementary Note 7)

The information processing device according to Supplementary Note 5 or 6, wherein the second similarities correspond to relations between feature vectors corresponding to the second study images and a feature vector corresponding to the restored image.

(Supplementary Note 8)

The information processing device according to any one of Supplementary Notes 1 to 7, wherein the estimation means includes: degraded image generation means; feature vector calculation means; degradation process estimation dictionary creation means; degradation process estimation dictionary means; and feature vector classification means, the degraded image generation means generates the first degraded images from the study images on a basis of the degradation processes, and outputs the generated first degraded images to the feature vector calculation means, the feature vector calculation means generates the feature vectors corresponding to the first degraded images, and outputs the feature vectors corresponding to the first degraded images to the degradation process estimation dictionary creation means, the degradation process estimation dictionary creation means generates correspondence information that indicates relations between the feature vectors corresponding to the first degraded images and the degradation processes corresponding to the feature vectors corresponding to the first degraded images, and outputs the generated correspondence information to the degradation process estimation dictionary means, the degradation process estimation dictionary means stores the correspondence information, the feature vector calculation means calculates the feature vector corresponding to the region in the input image, and outputs the feature vector corresponding to the region in the input image to the feature vector classification means, and the feature vector classification means classifies the feature vector corresponding to the region in the input image into one of classes of the degradation processes on a basis of relations between the feature vector corresponding to the region in the input image and the feature vectors included in the correspondence information, and outputs the estimated degradation process corresponding to the class into which the feature vector corresponding to the local region in the input image is classified to the outside, the classes being of the feature vectors included in the correspondence information.

(Supplementary Note 9)

The information processing device according to Supplementary Note 8, wherein the degradation process estimation dictionary creation means compresses the feature vectors corresponding to the first degraded images, and generates the correspondence information that indicates relations between the compressed feature vectors and the degradation processes.

(Supplementary Note 10)

The information processing device according to any one of Supplementary Notes 1 to 9, wherein the estimation means outputs a first degraded image in the first degraded images as the estimated degradation process, the first degraded image being related to the degradation process corresponding to the region in the input image.

(Supplementary Note 11)

The information processing device according to any one of Supplementary Notes 1 to 10, further comprising:

degradation information input means for allowing a user to input degradation information of the input image, wherein, further on a basis of the degradation information, the estimation means outputs the estimated degradation process.

(Supplementary Note 12)

An image processing method using a computer implementing the image processing method, the image processing method comprising:

acquiring a plurality of first study images and an input image; and outputting an estimated degradation process on a basis of first similarities between an arbitrary region in the input image and respective ones of a plurality of first degraded images when regions, in the first study images, corresponding to the region are degraded on a basis of respective ones of a plurality of degradation processes.

(Supplementary Note 13)

The information processing method according to Supplementary Note 12, using the computer, wherein the outputting of the estimated degradation process includes outputting information discriminating the degradation process related to the region in the input image as the estimated degradation process further on a basis of correspondence relations between respective ones of the first degraded images and the degradation processes from the first study images to respective ones of the first degraded images.

(Supplementary Note 14)

The information processing method according to Supplementary Note 12 or 13, wherein the first similarities correspond to relations between feature vectors corresponding to the first degraded images and a feature vector corresponding to the region in the input image.

(Supplementary Note 15)

The information processing method according to Supplementary Note 14, using the computer, wherein the outputting of the estimated degradation process includes outputting the estimated degradation process that corresponds to one of k (k is a natural number equal to or greater than 1) degradation processes of k-nearest neighbors, the k degradation processes being related to the region in the input image.

(Supplementary Note 16)

The information processing method according to any one of Supplementary Notes 12 to 15, using the computer, further comprising:

creating a dictionary that stores a plurality of patch pairs each of which includes a degraded patch and a restored patch, the degraded patch being a patch in a second degraded image into which a second study image is degraded on a basis of the estimated degradation process, the restored patch being a patch in the second study image;

generating a restored image from the input image by using the dictionary, and outputting the generated restored image; and selecting the first study images on a basis of second similarities between the first study images and the restored image, wherein, the outputting of the estimated degradation process includes outputting the estimated degradation process further on a basis of the first similarities between respective ones of a plurality of first degraded images into which the regions in the selected first study images are degraded and the region in the input image.

(Supplementary Note 17)

The information processing method according to Supplementary Note 16, using the computer, wherein the outputting of the estimated degradation process includes outputting information discriminating the degradation process related to the region in the input image as the estimated degradation process further on a basis of correspondence relations between respective ones of the first degraded images and degradation processes from the selected first study images to respective ones of the first degraded images.

(Supplementary Note 18)

The information processing method according to Supplementary Note 16 or 17, wherein the second similarities correspond to relations between feature vectors corresponding to the second study images and a feature vector corresponding to the restored image.

(Supplementary Note 19)

The information processing method according to any one of Supplementary Notes 12 to 18, using the computer, wherein the outputting of the estimated degradation process includes:

generating the first degraded images from the study images on a basis of the degradation processes, and outputting the generated first degraded images;

generating the feature vectors corresponding to the first degraded images, and outputting the feature vectors corresponding to the first degraded images;

generating correspondence information that indicates relations between the feature vectors corresponding to the first degraded images and the degradation processes corresponding to the feature vectors corresponding to the first degraded images, and outputting the generated correspondence information;

storing the correspondence information;

calculating the feature vector corresponding to the region in the input image, and outputting the feature vector corresponding to the region in the input image; and classifying the feature vector corresponding to the region in the input image into one of classes of the degradation processes on a basis of relations between the feature vector corresponding to the region in the input image and the feature vectors included in the correspondence information, and outputting the estimated degradation process corresponding to the class into which the feature vector corresponding to the local region in the input image is classified to the outside, the classes being of the feature vectors included in the correspondence information.

(Supplementary Note 20)

The information processing method according to Supplementary Note 19, using the computer, wherein the generating of correspondence information includes compressing the feature vectors corresponding to the first degraded images, and generates the correspondence information that indicates relations between the compressed feature vectors and the degradation processes.

(Supplementary Note 21)

The information processing method according to any one of Supplementary Notes 12 to 20, using the computer, wherein the outputting of the estimated degradation process includes outputting a first degraded image in the first degraded images as the estimated degradation process, the first degraded image being related to the degradation process corresponding to the region in the input image.

(Supplementary Note 22)

A program causing a computer to execute processing of:

acquiring a plurality of first study image and an input image; and outputting an estimated degradation process on a basis of first similarities between an arbitrary region in the input image and respective ones of a plurality of first degraded images when regions, in the first study images, corresponding to the region are degraded on a basis of respective ones of a plurality of degradation processes.

(Supplementary Note 23)

The program according to Supplementary Note 22, the program causing a computer to execute processing of:

further on a basis of correspondence relations between respective ones of the first degraded images and the degradation processes from the first study images to respective ones of the first degraded images, outputting information discriminating the degradation process related to the region in the input image as the estimated degradation process.

(Supplementary Note 24)

The program according to Supplementary Note 22 or 23, wherein the first similarities correspond to relations between feature vectors corresponding to the first degraded images and a feature vector corresponding to the region in the input image.

(Supplementary Note 25)

The program according to Supplementary Note 24, the program causing a computer to execute processing of:

outputting the estimated degradation process that corresponds to one of k (k is a natural number equal to or greater than 1) degradation processes of k-nearest neighbors, the k degradation processes being related to the region in the input image.

(Supplementary Note 26)

The program according to any one of Supplementary Notes 22 to 25, the program further causing a computer to execute processing of:

creating a dictionary that stores a plurality of patch pairs each of which includes a degraded patch and a restored patch, the degraded patch being a patch in a second degraded image into which a second study image is degraded on a basis of the estimated degradation process, the restored patch being a patch in the second study image;

generating a restored image from the input image by using the dictionary, and outputting the generated restored image; and selecting the first study images on a basis of second similarities between the first study images and the restored image, further on a basis of the first similarities between respective ones of a plurality of first degraded images into which the regions in the selected first study images are degraded and the region in the input image, outputting the estimated degradation process.

(Supplementary Note 27)

The program according to Supplementary Note 26, the program causing a computer to execute processing of:

further on a basis of correspondence relations between respective ones of the first degraded images and degradation processes from the selected first study images to respective ones of the first degraded images, outputting information discriminating the degradation process related to the region in the input image as the estimated degradation process.

(Supplementary Note 28)

The program according to Supplementary Note 26 or 27, the program causing a computer to execute processing of:

wherein the second similarities correspond to relations between feature vectors corresponding to the second study images and a feature vector corresponding to the restored image.

(Supplementary Note 29)

The program according to any one of Supplementary Notes 22 to 28, the program causing a computer to execute processing of:

generating the first degraded images from the study images on a basis of the degradation processes, and outputting the generated first degraded images, generating the feature vectors corresponding to the first degraded images, and outputting the feature vectors corresponding to the first degraded images, generating correspondence information that indicates relations between the feature vectors corresponding to the first degraded images and the degradation processes corresponding to the feature vectors corresponding to the first degraded images, and outputting the generated correspondence information, storing the correspondence information, calculating the feature vector corresponding to the region in the input image, and outputting the feature vector corresponding to the region in the input image, and classifying the feature vector corresponding to the region in the input image into one of classes of the degradation processes on a basis of relations between the feature vector corresponding to the region in the input image and the feature vectors included in the correspondence information, and outputting the estimated degradation process corresponding to the class into which the feature vector corresponding to the local region in the input image is classified to the outside, the classes being of the feature vectors included in the correspondence information.

(Supplementary Note 30)

The program according to Supplementary Note 29, the program causing a computer to execute processing of:

compressing the feature vectors corresponding to the first degraded images, and generates the correspondence information that indicates relations between the compressed feature vectors and the degradation processes.

(Supplementary Note 31)

The program according to any one of Supplementary Notes 22 to 30, the program causing a computer to execute processing of:

outputting a first degraded image in the first degraded images as the estimated degradation process, the first degraded image being related to the degradation process corresponding to the region in the input image.

(Supplementary Note 32) A non-transitory computer readable recording medium storing the program according to any one of Supplementary Notes 22 to 31.

(Supplementary Note 33)

An information processing device comprising:

a processor; and a memory unit storing instructions for the processor to operate as image acquisition means, and estimation means, wherein the image acquisition means acquires a plurality of first study images and an input image, the estimation means outputs an estimated degradation process on a basis of first similarities between an arbitrary region in the input image and respective ones of a plurality of first degraded images when regions corresponding to the regions in the first study images are degraded on a basis of respective ones of a plurality of degradation processes, and the estimated degradation process corresponds to a degradation process in the degradation processes, the degradation process being related to the region in the input image.

The present invention was described above through exemplary embodiments thereof, but the present invention is not limited to the above exemplary embodiments. Various modifications that could be understood by a person skilled in the art may be applied to the configurations and details of the present invention within the scope of the present invention.

This application claims priority based on Japanese Patent Application No. 2013-168793, filed on Aug. 15, 2013, the entire disclosure of which is incorporated herein by reference.

REFERENCE SIGNS LIST

100 Degradation process estimation device
101 Image processing system
102 Study unit
103 Dictionary
104 Restoration unit
110 Correspondence information generation unit
120 Degradation process selection unit
150 Image acquisition unit
151 Study image acquisition unit
152 Input image acquisition unit
160 Estimation unit
161 Degraded image group generation unit
162 Feature vector calculation unit
163 Degradation process estimation dictionary creation unit
164 Feature vector classification unit
165 Degradation process estimation dictionary
166 Degradation process estimation dictionary creation unit
167 Feature vector classification unit
168 Degraded image estimation dictionary
200 Degradation process estimation device
201 Image processing system
202 Study unit
210 Correspondence information generation unit
220 Degradation process selection unit
260 Estimation unit
300 Degradation process estimation device
301 Image processing system
340 Study image selection unit
360 Estimation unit
401 Restored patch
402 Degraded patch
403 Patch pair
410 Study image
411 Study image
420 Degraded image 421 Degraded image
430 Input image
431 Input patch
440 Restored image
700 Computer
701 CPU
702 Storage unit
703 Storage device
704 Input unit
705 Output unit
706 Communication unit
707 Recording medium
851 Similarity
852 Similarity
860 Correspondence information
861 Degradation process
862 Feature vector
864 Feature vector
867 Estimated degradation process
1021 Reception unit
1022 Degraded image generation unit
1023 Patch pair generation unit
1024 Registration unit
1041 Reception unit
1042 Patch generation unit
1043 Restored image generation unit

The invention claimed is:

1. An information processing device comprising circuitry configured to:
acquire a plurality of first study images and an input image;
output an estimated degradation process on a basis of first similarities between an arbitrary region in the input image and respective ones of a plurality of first degraded images, wherein corresponding regions in the first study images are degraded on a basis of respective ones of a plurality of degradation processes; and
create a dictionary that stores a plurality of patch pairs each of which includes a degraded patch and a restored patch, the degraded patch being a patch in a second degraded image into which a second study image is degraded on a basis of the estimated degradation process, the restored patch being a patch in the second study image,
wherein the estimated degradation process corresponds to a degradation process in the degradation processes, the degradation process being related to the region in the input image.

2. The information processing device according to claim 1, wherein the circuitry is further configured to:
on a basis of correspondence relations between respective ones of the first degraded images and the degradation processes from the first study images to respective ones of the first degraded images, output information discriminating the degradation process related to the region in the input image as the estimated degradation process.

3. The information processing device according to claim 1,
wherein the first similarities correspond to relations between feature vectors corresponding to the first degraded images and a feature vector corresponding to the region in the input image.

4. The information processing device according to claim 3, wherein the circuitry is further configured to:
output the estimated degradation process that corresponds to one of k (k is a natural number equal to or greater than 1) degradation processes of k-nearest neighbors, the k degradation processes being related to the region in the input image.

5. The information processing device according to claim 1, wherein the circuitry is further configured to:
generate a restored image from the input image by using the dictionary, and output the generated restored image;
select the first study images on a basis of second similarities between the first study images and the restored image; and
on a basis of the first similarities between respective ones of a plurality of first degraded images into which the regions in the selected first study images are degraded and the region in the input image, output the estimated degradation process.

6. The information processing device according to claim 5, wherein the circuitry is further configured to:
on a basis of correspondence relations between respective ones of the first degraded images and degradation processes from the selected first study images to respective ones of the first degraded images, output information discriminating the degradation process related to the region in the input image as the estimated degradation process.

7. The information processing device according to claim 5,
wherein the second similarities correspond to relations between feature vectors corresponding to the second study images and a feature vector corresponding to the restored image.

8. The information processing device according to claim 1, wherein the circuitry is further configured to:
generate the first degraded images from the first study images on a basis of the degradation processes;
generate the feature vectors corresponding to the first degraded images;
generate correspondence information that indicates relations between the feature vectors corresponding to the first degraded images and the degradation processes corresponding to the feature vectors corresponding to the first degraded images;
calculate the feature vector corresponding to the region in the input image;
classify the feature vector corresponding to the region in the input image into one of classes of the degradation processes on a basis of relations between the feature vector corresponding to the region in the input image and the feature vectors included in the correspondence information; and
output the estimated degradation process corresponding to the class into which the feature vector corresponding to the region in the input image is classified to the outside.

9. The information processing device according to claim 8, wherein the circuitry is further configured to:
compress the feature vectors corresponding to the first degraded images; and
generate the correspondence information that indicates relations between the compressed feature vectors and the degradation processes.

10. The information processing device according to claim 1, wherein the circuitry is further configured to:
output a first degraded image in the first degraded images as the estimated degradation process, the first degraded image being related to the degradation process corresponding to the region in the input image.

11. The information processing device according to claim 1, wherein the circuitry is further configured to:
    allow a user to input degradation information of the input image, and
    further on a basis of the degradation information, output the estimated degradation process.

12. An image processing method using a computer implementing the image processing method, the image processing method comprising:
    acquiring a plurality of first study images and an input image;
    outputting an estimated degradation process on a basis of first similarities between an arbitrary region in the input image and respective ones of a plurality of first degraded images, wherein corresponding regions in the first study images are degraded on a basis of respective ones of a plurality of degradation processes; and
    creating a dictionary that stores a plurality of patch pairs each of which includes a degraded patch and a restored patch, the degraded patch being a patch in a second degraded image into which a second study image is degraded on a basis of the estimated degradation process, the restored patch being a patch in the second study image.

13. A non-transitory computer-readable recording medium storing a set of instructions which, when executed, causes a process of a computer to perform a method of information processing, the method comprising:
    acquiring a plurality of first study image and an input image; and
    outputting an estimated degradation process on a basis of first similarities between an arbitrary region in the input image and respective ones of a plurality of first degraded images, wherein corresponding regions in the first study images are degraded on a basis of respective ones of a plurality of degradation processes; and
    creating a dictionary that stores a plurality of patch pairs each of which includes a degraded patch and a restored patch, the degraded patch being a patch in a second degraded image into which a second study image is degraded on a basis of the estimated degradation process, the restored patch being a patch in the second study image.

14. An information processing device comprising:
a memory storing instructions; and
at least one processor configured to:
    acquire a plurality of first study images and an input image;
    output an estimated degradation process on a basis of first similarities between an arbitrary region in the input image and respective ones of a plurality of first degraded images, wherein corresponding regions in the first study images are degraded on a basis of respective ones of a plurality of degradation processes; and
    create a dictionary that stores a plurality of patch pairs each of which includes a degraded patch and a restored patch, the degraded patch being a patch in a second degraded image into which a second study image is degraded on a basis of the estimated degradation process, the restored patch being a patch in the second study image,
    wherein the estimated degradation process corresponds to a degradation process in the degradation processes, the degradation process being related to the region in the input image.

* * * * *